United States Patent
Marton

(10) Patent No.: US 10,058,939 B1
(45) Date of Patent: Aug. 28, 2018

(54) ADAPTER TO CONVERT A 3-AXIS MILLING MACHINE TO A 5-AXIS MILLING MACHINE

(71) Applicant: MPM Leasing Group, LLC, Fullerton, CA (US)

(72) Inventor: Daniel J. Marton, Yorba Linda, CA (US)

(73) Assignee: MPM Leasing Group, LLC, Fullerton, CA (US)

( * ) Notice: Subject to any disclaimer, the term of this patent is extended or adjusted under 35 U.S.C. 154(b) by 0 days.

(21) Appl. No.: 15/221,297

(22) Filed: Jul. 27, 2016

Related U.S. Application Data

(60) Provisional application No. 62/327,037, filed on Apr. 25, 2016.

(51) Int. Cl.
   *B23Q 1/25* (2006.01)
   *B23C 9/00* (2006.01)
   (Continued)

(52) U.S. Cl.
   CPC .............. *B23C 9/005* (2013.01); *B23C 1/002* (2013.01); *B23C 1/06* (2013.01); *B23C 1/12* (2013.01);
   (Continued)

(58) Field of Classification Search
   CPC .... B23C 1/06; B23C 1/12; B23Q 1/25; B23Q 1/5406; Y10T 409/307672;
   (Continued)

(56) References Cited

U.S. PATENT DOCUMENTS

| 4,569,627 A | * | 2/1986 | Simunovic | ................ B25J 9/04 33/613 |
| 4,658,485 A | * | 4/1987 | Yang | ..................... B23Q 1/012 29/26 A |

(Continued)

FOREIGN PATENT DOCUMENTS

JP  09300148 A  * 11/1997

OTHER PUBLICATIONS

"Tri-Tech 5-Axis Spindle Head," Tri-Tech Precision Products, Inc., Apr. 2015, Website Images Downloaded from http://www.5-axis.com on Oct. 6, 2016, 12 pages.

*Primary Examiner* — Nicole N Ramos
(74) *Attorney, Agent, or Firm* — Patterson Intellectual Property Law, P.C.; Jerry Turner Sewell

(57) ABSTRACT

An adapter converts a three-axis milling machine to a five-axis milling machine includes two gimbal assemblies. A first gimbal assembly is configured to rotate about a first rotation axis. A second gimbal assembly is rotatably connected to the first gimbal assembly to rotate about a second rotation axis orthogonal to the first rotation axis. A first gimbal positioning system is operable to rotate the first gimbal assembly about the first rotation axis with a rotational movement of a first leadscrew positioned in a first plane orthogonal to the first rotation axis. A second gimbal positioning system is operable to rotate the second gimbal assembly about the second rotation axis with a rotational movement of the second leadscrew positioned in a second plane orthogonal to the second rotation axis. The second gimbal assembly includes a spindle and a motor coupled to the spindle to selectively rotate the spindle.

5 Claims, 42 Drawing Sheets

(51) Int. Cl.
*B23C 1/00* (2006.01)
*B23C 1/06* (2006.01)
*B23C 1/12* (2006.01)

(52) U.S. Cl.
CPC .............. *B23Q 1/25* (2013.01); *Y10T 408/93* (2015.01); *Y10T 409/307672* (2015.01)

(58) Field of Classification Search
CPC . Y10T 409/309576; Y10T 409/308232; Y10T 409/308512; Y10T 408/93; Y10T 408/935
See application file for complete search history.

(56) References Cited

U.S. PATENT DOCUMENTS

| | | | |
|---|---|---|---|
| 5,718,545 A | | 2/1998 | Husted |
| 5,807,044 A * | | 9/1998 | Watari ................. B23Q 1/5481 |
| | | | 408/236 |
| 5,808,888 A * | | 9/1998 | Susnjara .............. G05B 19/423 |
| | | | 700/195 |
| 5,865,576 A * | | 2/1999 | Arai .................... B23Q 1/5462 |
| | | | 219/121.67 |
| 6,447,224 B2 * | | 9/2002 | Mitsuzono ............. B23Q 1/012 |
| | | | 409/201 |
| 6,988,434 B1 * | | 1/2006 | Jiao .................... B23Q 1/4866 |
| | | | 451/11 |
| 7,475,613 B2 * | | 1/2009 | Bailey ................. B23Q 1/5412 |
| | | | 248/181.1 |
| 8,414,233 B2 * | | 4/2013 | Matsui .................... B23Q 1/44 |
| | | | 409/201 |
| 2010/0092260 A1 * | | 4/2010 | Hohn ....................... B23C 3/18 |
| | | | 409/132 |

* cited by examiner

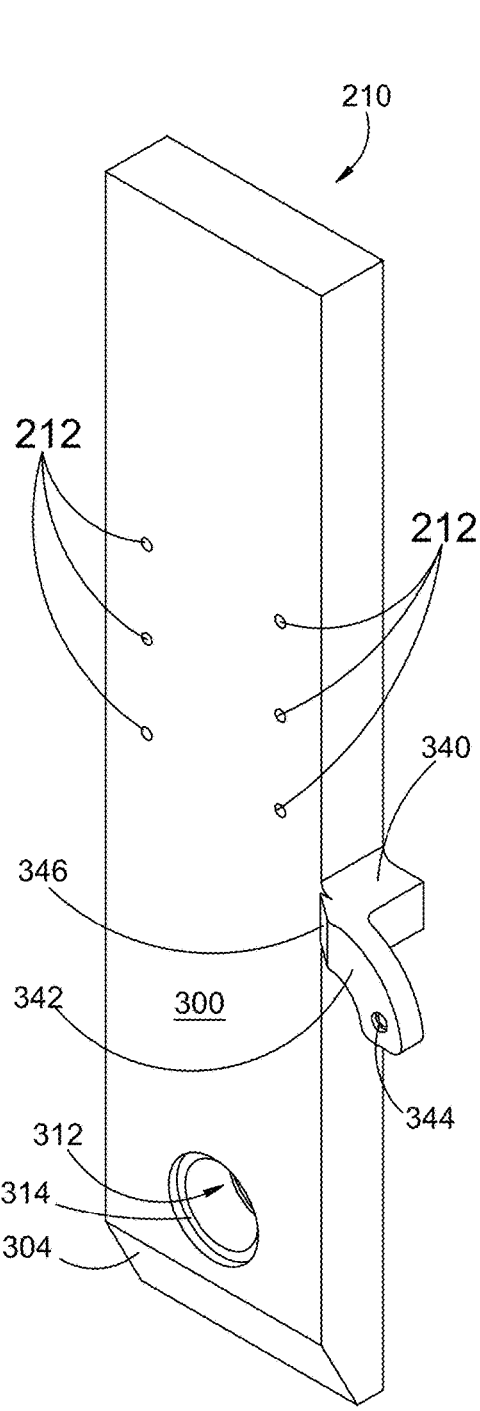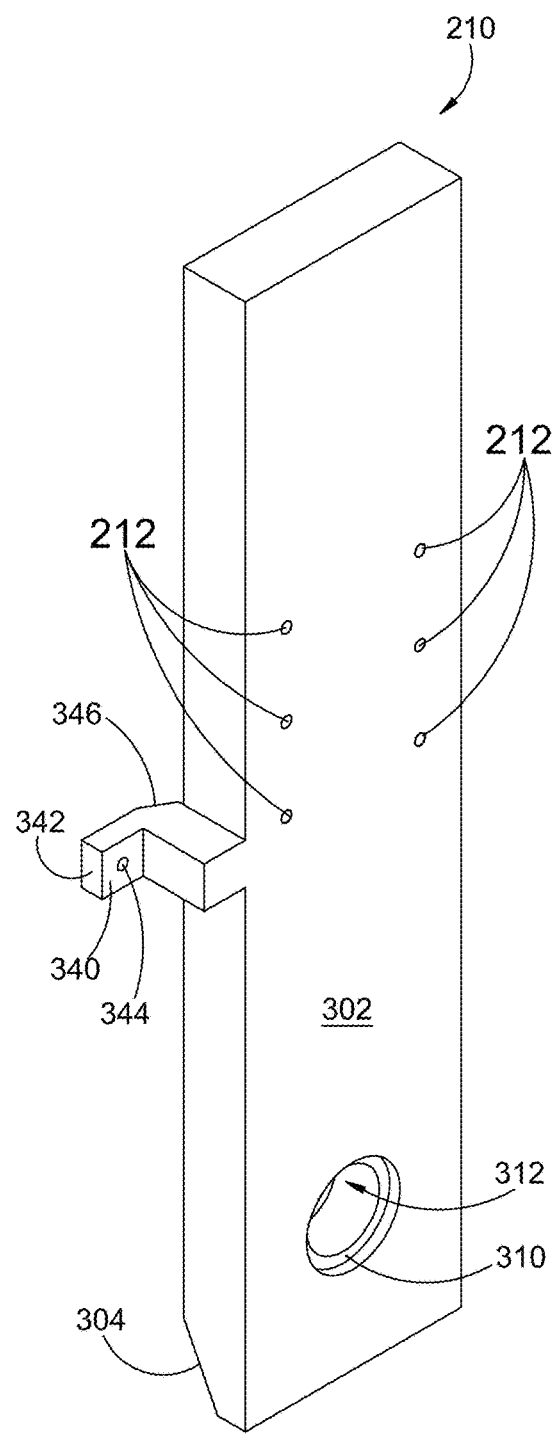
Fig. 17A                        Fig. 17B

ADAPTER TO CONVERT A 3-AXIS MILLING MACHINE TO A 5-AXIS MILLING MACHINE

RELATED APPLICATIONS

The present application claims the benefit of priority under 35 USC § 119(e) from U.S. Provisional Application No. 62/327,037 filed on Apr. 25, 2016, for "Adapter to Convert a 3-Axis Milling Machine to a 5-Axis Milling Machine," which is hereby incorporated herein by reference.

FIELD OF THE INVENTION

The present invention is in the field of milling machines, and, more particularly, is in the field of multi-axis milling machines.

BACKGROUND OF THE INVENTION

A conventional milling machine is operable in three axes. A part to be milled is secured to a bed of the milling machine. A milling machine head is movable with respect to the bed in a first direction (e.g., along an X-axis) and is movable with respect to the bed in a second direction orthogonal to the first direction (e.g., along a Y-axis). Usually, the X-axis and the Y-axis are in a horizontal plane parallel to the floor of a factory, machine shop or other facility in which the milling machine is operated. Once the milling machine head is positioned over the portion of the part to be milled, a rotating chuck holding the tool to be used on the part is moved downward to engage the part and to remove selected portions of the part to a depth determined by the positioning of the rotating chuck in the Z-axis direction. The Z-axis direction is orthogonal to both the X-axis and the Y-axis, and, in the conventional setting, the Z-axis is orthogonal to the floor of the facility in which the milling machine is located. In some operations, the movement of the milling machine head or the chuck may occur along one axis at any time. Depending on the type of tool installed in the chuck, the milling machine head may be moved along one or both of the X-axis and the Y-axis at the same time as the position of the chuck is adjusted along the Z-axis in complex milling operations. The operations of multi-axis milling machines are typically controlled by a computer numerical control (CNC) system. In addition to controlling the positioning of the milling machine head and the control of the depth of the chuck, many CNC systems also automatically change the tool to be used from a tool carousel or other tool holder.

Milling machines are also available with 5 axes of movement. Unlike conventional 3-axis milling machines, which provide linear movement in each of three orthogonal directions, a 5-axis milling machine provides two additional movements for the tool chuck. In particular, the tool chuck is rotatable about a first rotational axis (e.g., an A-axis) and is also rotatable about a second rotatable axis (e.g., a B-axis) to enable the positioning of the tool at angles with respect to the part being machined. Typically, the A-axis is parallel to or coincident with the existing Y-axis; and the B-axis is parallel to or coincident with the existing X-axis. Although 5-axis milling machines are commercially available, such machines are more expensive than conventional milling machines. Also, many companies have conventional 3-axis milling machines in place to handle a large portion of the milling projects. Replacing one or more of the 3-axis milling machines with a 5-axis machine is an unnecessary and unacceptable expense for many small companies on a tight capital equipment budget.

SUMMARY OF THE INVENTION

A need exists for an adapter that enables a conventional 3-axis milling machine to be easily converted to a 5-axis milling machine without requiring modification of the basic structure of the 3-axis milling machine. The adapter should be economical so that the cost of the adapter is much lower than the cost of upgrading from a 3-axis milling machine to a 5-axis milling machine. The adapter should be useable on a number of different 3-axis milling machines.

One aspect of the embodiments disclosed herein is an adapter that converts a three-axis milling machine to a five-axis milling machine. The adapter includes two gimbal assemblies. A first gimbal assembly is configured to rotate about a first rotation axis. A second gimbal assembly is rotatably connected to the first gimbal assembly to rotate about a second rotation axis orthogonal to the first rotation axis. A first gimbal positioning system is operable to rotate the first gimbal assembly about the first rotation axis with a rotational movement of a first leadscrew positioned in a first plane orthogonal to the first rotation axis. A second gimbal positioning system is operable to rotate the second gimbal assembly about the second rotation axis with a rotational movement of the second leadscrew positioned in a second plane orthogonal to the second rotation axis. The second gimbal assembly includes a spindle and a motor coupled to the spindle to selectively rotate the spindle.

Another aspect of the embodiments disclosed herein is an adapter to convert a three-axis milling machine to a five-axis milling machine, wherein the milling machine includes a head support, wherein the milling machine operable to move the head support in three orthogonal axes. The adapter comprises a base platform configured to attach to the head support of the milling machine. A first gimbal assembly is rotatably connected to the base platform to rotate about a first rotation axis. A second gimbal assembly is rotatably connected to the first gimbal assembly to rotate about a second rotation axis orthogonal to the first rotation axis. The second gimbal assembly includes a spindle. A motor is coupled to the spindle to selectively rotate the spindle. A first gimbal positioning system is operable to rotate the first gimbal assembly about the first rotation axis. The first gimbal positioning system includes a first motor rotatably connected to the base platform. A first leadscrew is driven by the first motor. A first leadscrew nut is rotatably coupled to the first gimbal assembly. The first leadscrew nut is configured to receive the first leadscrew. A second gimbal positioning system is operable to rotate the second gimbal assembly about the second rotation axis. The second gimbal positioning system includes a second motor rotatably connected to the first gimbal assembly. A second leadscrew is driven by the second motor. A second leadscrew nut is rotatably coupled to the second gimbal assembly. The second leadscrew nut is configured to receive the second leadscrew.

Yet another aspect of the embodiments disclosed herein is an adapter to convert a three-axis milling machine to a five-axis milling machine. A first gimbal assembly is configured to rotate about a first rotation axis. A second gimbal assembly is rotatably connected to the first gimbal assembly. The second gimbal assembly rotates about a second rotation axis orthogonal to the first rotation axis. A first gimbal positioning system is operable to rotate the first gimbal assembly about the first rotation axis with a rotational movement of a first leadscrew. The first leadscrew is positioned in a first plane orthogonal to the first rotation axis. A second gimbal positioning system is operable to rotate the second gimbal assembly about the second rotation axis with a rotational movement of the second leadscrew. The second leadscrew is positioned in a second plane orthogonal to the second rotation axis. The second gimbal assembly includes a spindle. A motor is coupled to the spindle to selectively rotate the spindle.

Still another aspect of the embodiments disclosed herein is a method of operating an adapter for converting a three-axis milling machine to a five-axis milling machine. The method includes rotating a first leadscrew of a first gimbal positioning system. The method also includes translating a first leadscrew nut coupled to the first leadscrew. The method further includes rotating a first gimbal assembly rotatably connected to the first leadscrew nut. The rotation of the first gimbal is responsive to translation of the first leadscrew nut. The method includes rotating a second leadscrew of a second gimbal positioning system. The method further includes translating a second leadscrew nut coupled to the second leadscrew. The method still further includes rotating a second gimbal assembly rotatably connected to the second leadscrew nut. The rotation of the second gimbal is responsive to translation of the second leadscrew nut. The second gimbal assembly is supporting a spindle and a motor coupled thereto.

A further aspect of the embodiments disclosed herein is a method of operating an adapter for converting a three-axis milling machine to a five-axis milling machine. The method includes activating a first motor; rotating a first leadscrew with the first motor; translating a first leadscrew nut with rotational movement of the first leadscrew; rotating a first gimbal assembly about a first axis with translational movement of the first leadscrew nut; rotating a second gimbal assembly about the first axis with rotational movement of the first gimbal assembly, the second gimbal assembly supporting a spindle and a motor coupled thereto; activating a second motor; rotating a second leadscrew with the second motor; translating a second leadscrew nut with rotational movement of the second leadscrew; and rotating the second gimbal assembly about a second axis with translational movement of the second leadscrew nut.

BRIEF DESCRIPTIONS OF THE DRAWINGS

The foregoing aspects and other aspects of the disclosure are described in detail below in connection with the accompanying drawings in which:

FIG. 1 illustrates a perspective view of a pictorial representation of a conventional milling machine showing a milling machine bed, a milling machine head moveable in two horizontal directions (along an X-axis and a Y-axis) with respect to the milling machine bed, and a chuck with attached tool installed on the milling machine head, the chuck moveable vertically (along a Z-axis) with respect to the milling machine bed;

FIG. 17A is a front perspective view of the base platform;

FIG. 17B is a rear perspective view of the base platform of FIG. 17A;

DESCRIPTION OF ILLUSTRATED EMBODIMENTS

Figure 1:
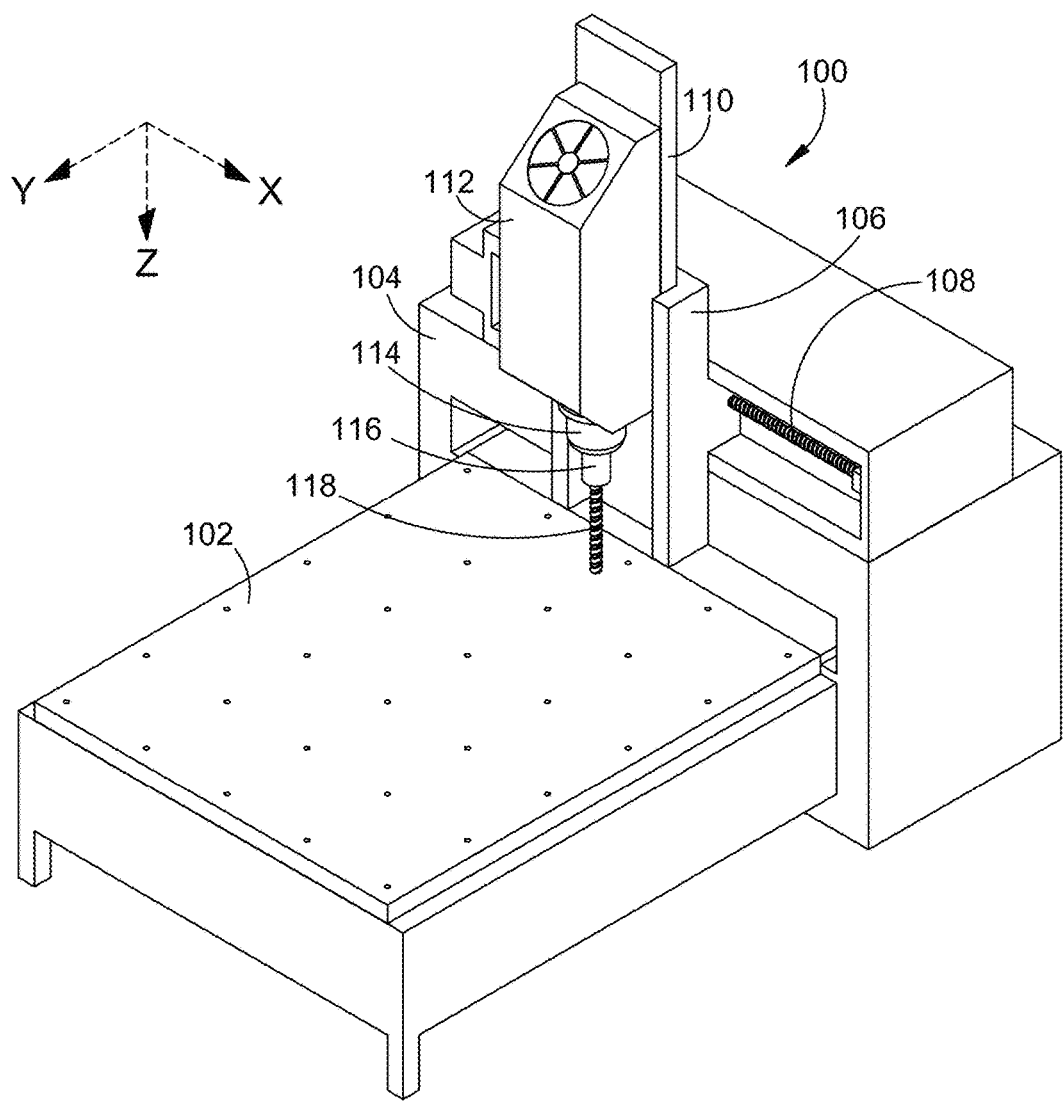

FIG. 1 illustrates a perspective view of a pictorial representation of a conventional 3-axis milling machine 100 showing a milling machine bed 102. The milling machine includes a gantry 104 that moves with respect to the fixed bed. In particular, the gantry is moveable in a first horizontal direction (along a Y-axis) with respect to the milling machine bed. A milling machine head support frame 106 is translatably mounted to the gantry. In particular, the head support frame is moveable in a second horizontal direction orthogonal to the first horizontal direction (along an X-axis). The head support frame translates along the gantry on an X-axis threaded rod 108 such that rotation of the threaded rod translates the head support frame. A vertically moveable head support 110 is attached to the head support frame. In particular, the head support is movable in a vertical direction orthogonal to the first and second horizontal directions (along a Z-axis). A milling machine head 112 is attached to the head support. The head includes a conventional rotatable spindle 114 driven by a motor (not shown). The spindle rotates a chuck 116 that removably receives a tool 118. The milling machine may further include a tool repository (not shown) for storage of various tools.

Because it is connected to the head support 110, the head 112 (and thus the tool 118) is moveable vertically (along a Z-axis) with respect to the gantry 104 and thus with respect to the milling machine bed 102 so that the rotating tool selectively engages a part (not shown) resting on and secured to the milling machine bed. The rotating tool selectively removes material from the part. The chuck 116 may operate the tool in a plunge mode to drill vertical holes in the part at locations determined by the X/Y location of the head with respect to the milling machine bed. With a suitable tool installed, the head may also be maintained in a fixed vertical position while the gantry or the head support frame 106 moves horizontally to cause the tool to produce longitudinal cuts in the part. The head may also be moved in multiple axes to produce longitudinal cuts with varying depths. The three axes (X, Y and Z) are represented pictorially in FIG. 1. The motor, the interconnection structures, and electronics to control the vertical motion of the milling machine head and the rotation of the spindle 114 are conventional and are not shown in the drawings.

The milling machine 100 in FIG. 1 has a fixed bed 102 and a moveable gantry 104. Other milling machines (not shown) may have a movable bed in the horizontal directions with a fixed gantry or other support for the milling machine head 112. In such embodiments, a part to be milled is moved in the X and Y directions. In such milling machines, the part may also be moved vertically with respect to the milling machine head, or the milling machine head may be moved vertically with respect to the part. Although the following description is directed to an adapter for a milling machine with a fixed bed and a moveable gantry, the adapter can also be used in combination with milling machines with moveable beds.

Figure 2:
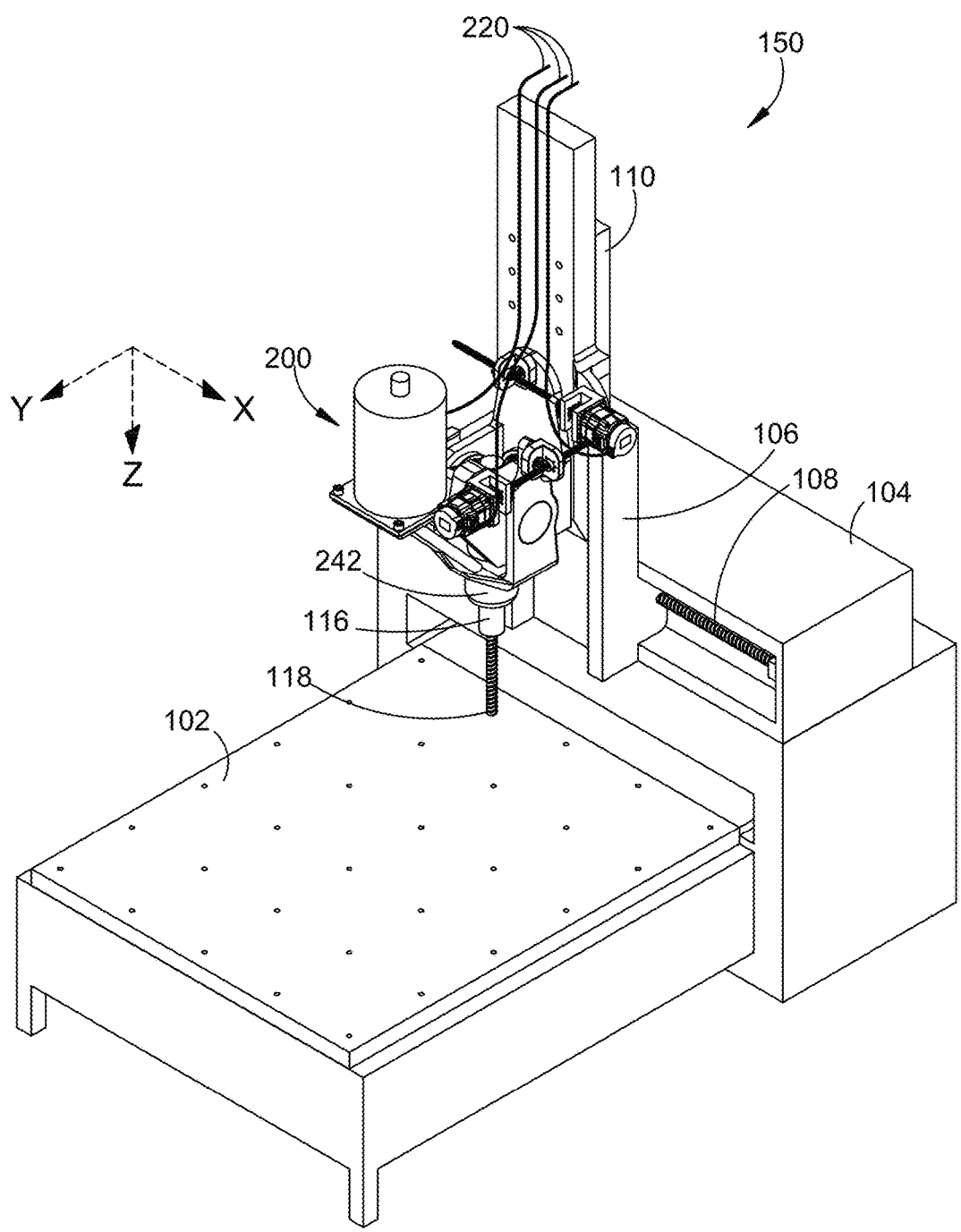
FIG. 2 illustrates a perspective view of the milling machine with an embodiment of the adapter of the present invention installed on the head support.

FIG. 2 illustrates a modified milling machine 150 including an embodiment of an adapter 200 installed on the head support 110 of the milling machine 100 described above. The adapter includes a base platform (or table) 210, which is connectable to the head support in place of the head 112. The base platform includes a plurality of unthreaded through bores 212, which are positioned such that the through bores are aligned with threaded bores (not shown) of the head support. The positions of the through bores in the base platform may be modified to conform to different configurations of threaded bores on head supports from other milling machine manufacturers. The adapter may be installed on the head support, in a non-limiting example, with a plurality of bolts (not shown) mounted through the through bores of the base platform and engaging the threaded bores of the head support. In an exemplary embodiment, the through bores are countersunk such that a corresponding bolt head may be received therein.

As further shown in FIG. 2, the adapter 200 may include at least one umbilical cable 220, which extends from the adapter and connects to a control unit (described below) to provide power to motors (described below) and, in some embodiments, to communicate feedback signals (described below) from the adapter to the control unit.

Figure 3:
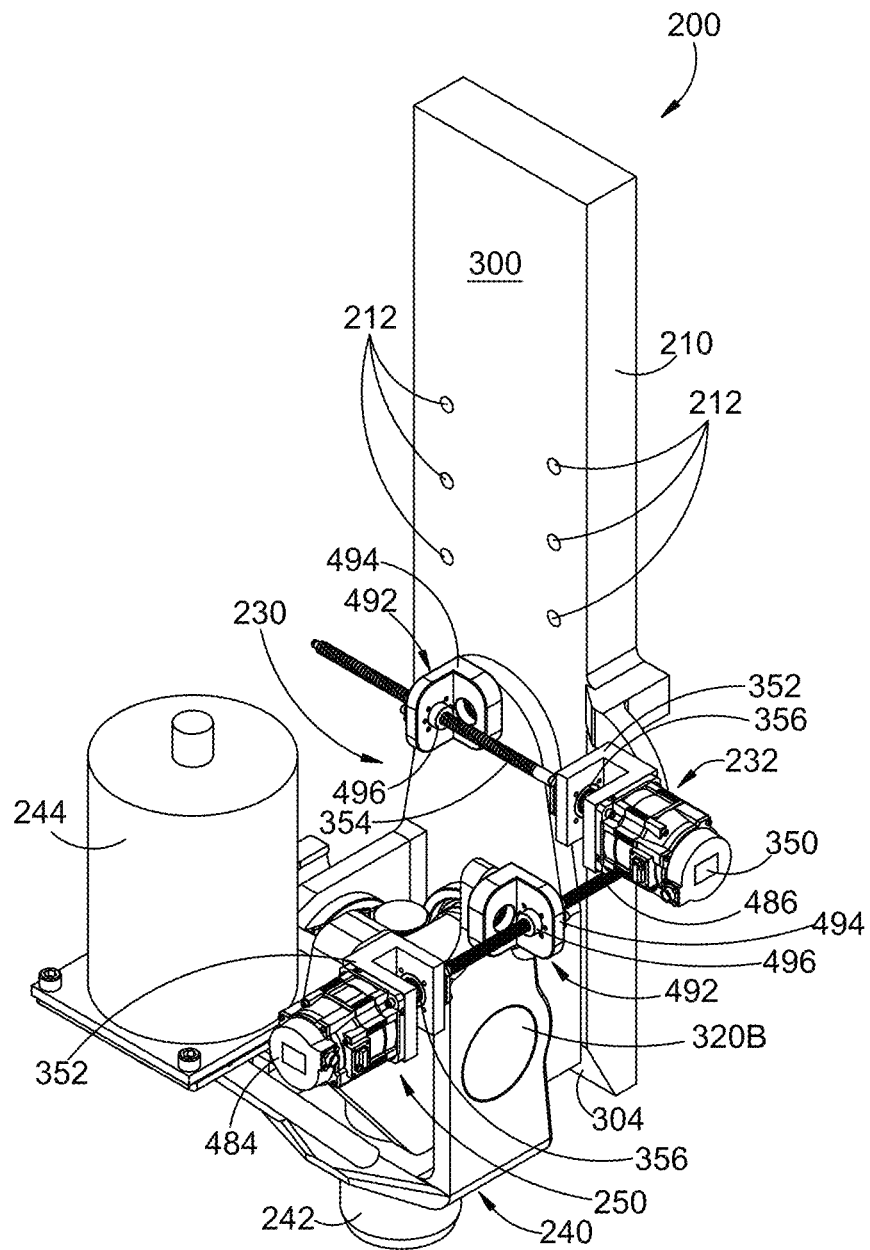
FIG. 3 is a top-front-right perspective view of the adapter of FIG. 2.
Figure 4:
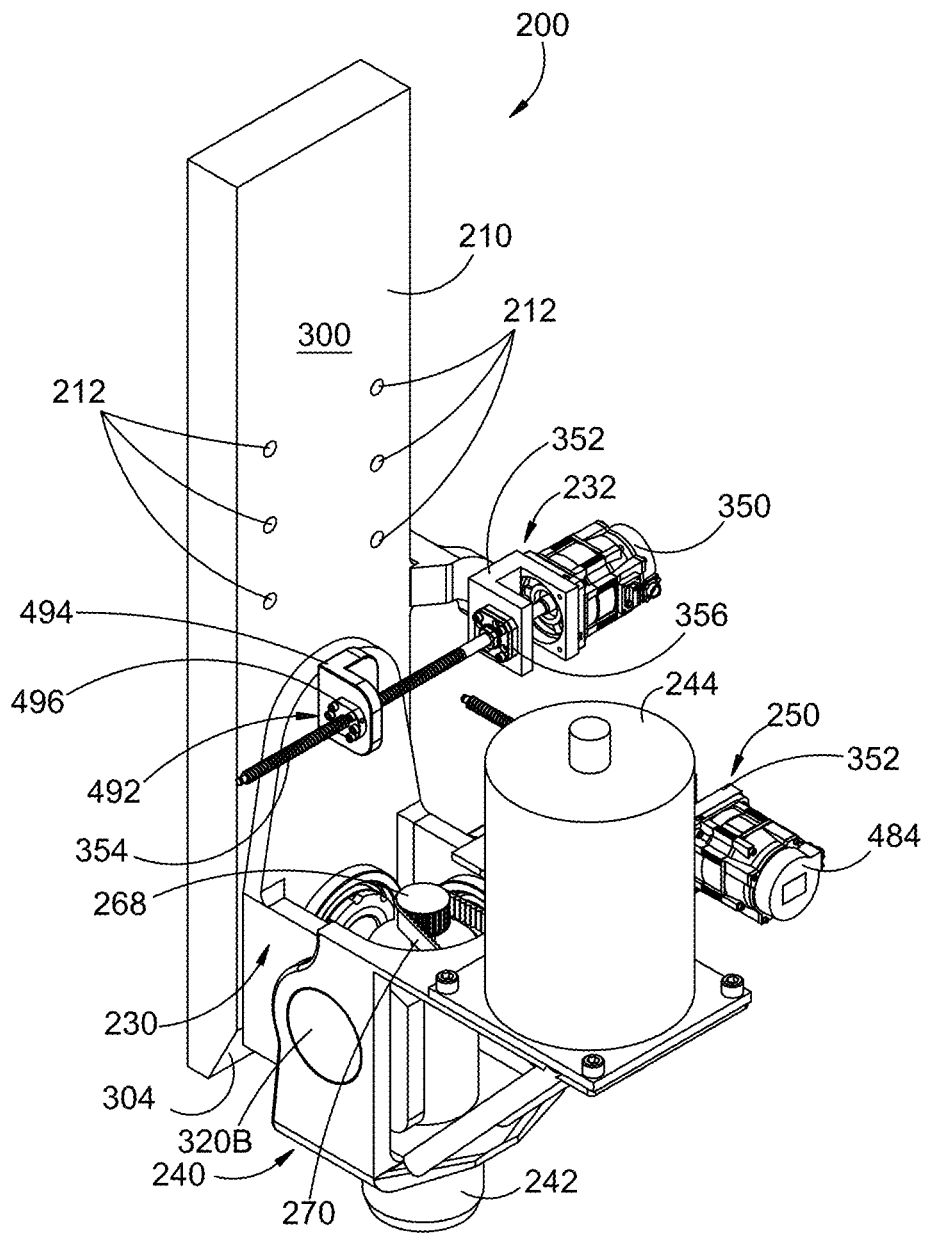
FIG. 4 is a top-front-left perspective view of the adapter of FIG. 2.
Figure 5:
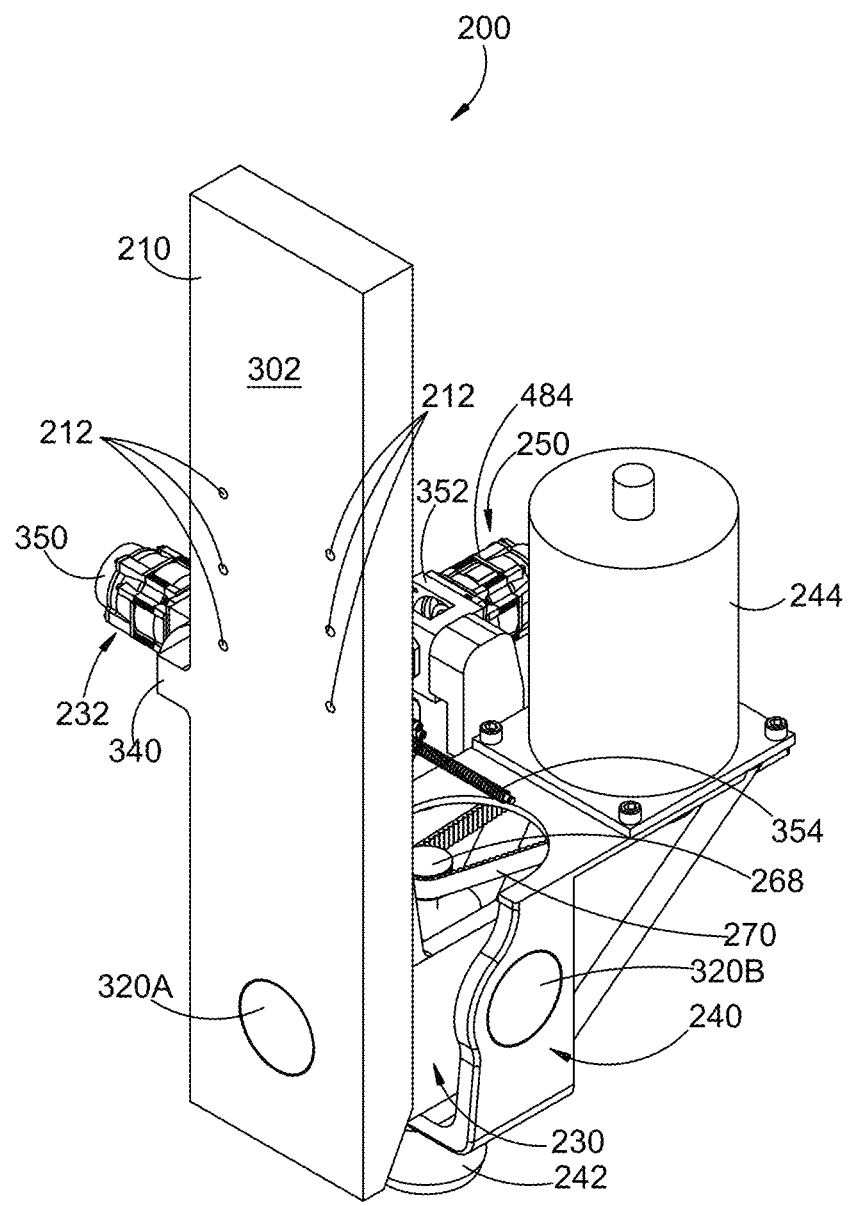
FIG. 5 is a top-back-left perspective view of the adapter of FIG. 2.
Figure 6:
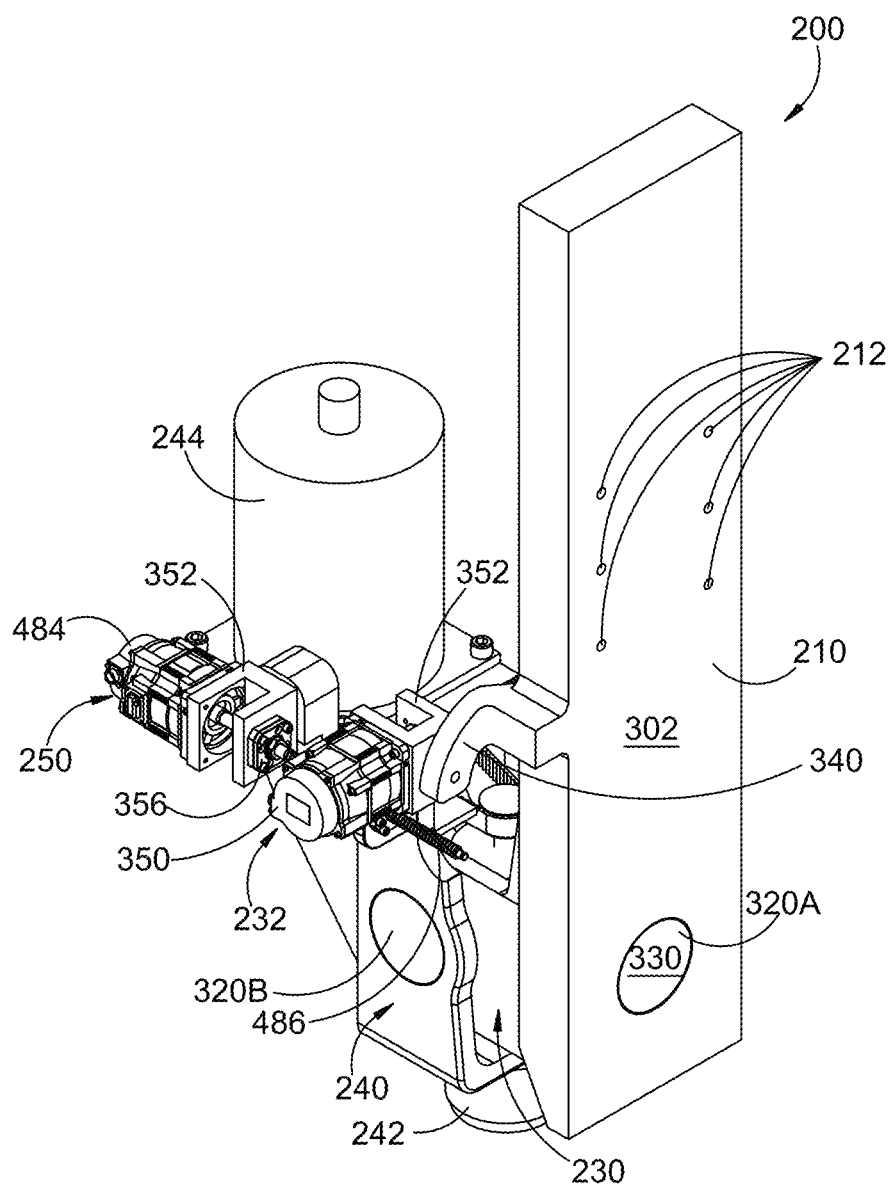
FIG. 6 is a top-back-right perspective view of the adapter of FIG. 2.

As shown in a perspective view in FIG. 3, the adapter 200 includes an A-axis gimbal assembly 230, which is rotatably coupled to the base platform 210. The A-axis gimbal assembly rotates about the A-axis, which may be an axis parallel to the Y-axis. The A-axis gimbal assembly includes an A-axis positioning system 232 that selectively rotates the A-axis gimbal assembly to a selected angular position with respect to the base platform. The A-axis positioning system will be described in more detail below.

The adapter 200 further includes a B-axis gimbal assembly 240, which is rotatably coupled to the A-axis gimbal assembly 230. The B-axis gimbal assembly rotates about the B-axis, which may be an axis orthogonal to the A-axis. The B-axis gimbal assembly includes a spindle 242 coupled to a spindle drive motor 244. A conventional tool chuck 116 may be secured to the end of the spindle. The tool chuck is configured to removably engage a conventional milling tool 118. The B-axis gimbal assembly further includes a B-axis positioning system 250 that selectively rotates the B-axis gimbal assembly to a selected angular position with respect to the A-axis gimbal assembly. The B-axis positioning system will be described in more detail below.

Figure 7:
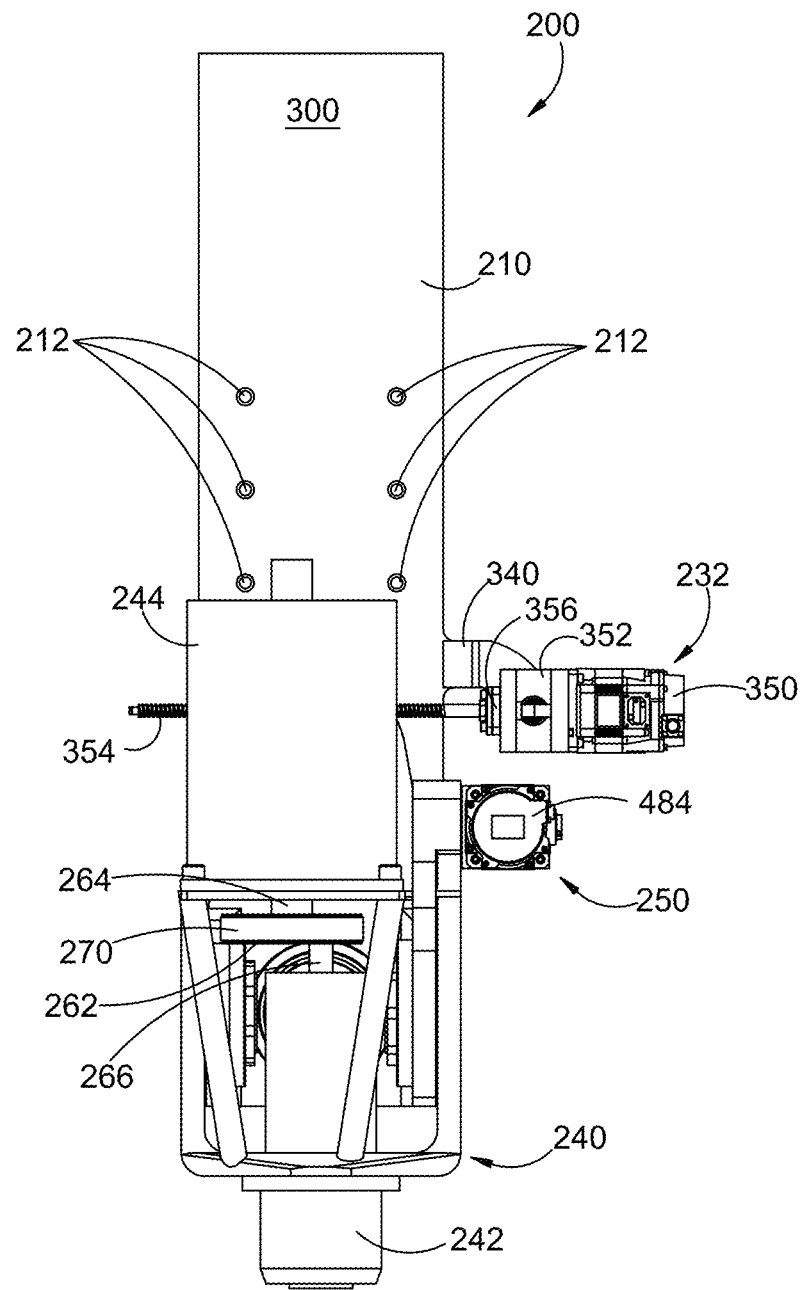
FIG. 7 is a front elevation view of the adapter of FIG. 2.
Figure 8:
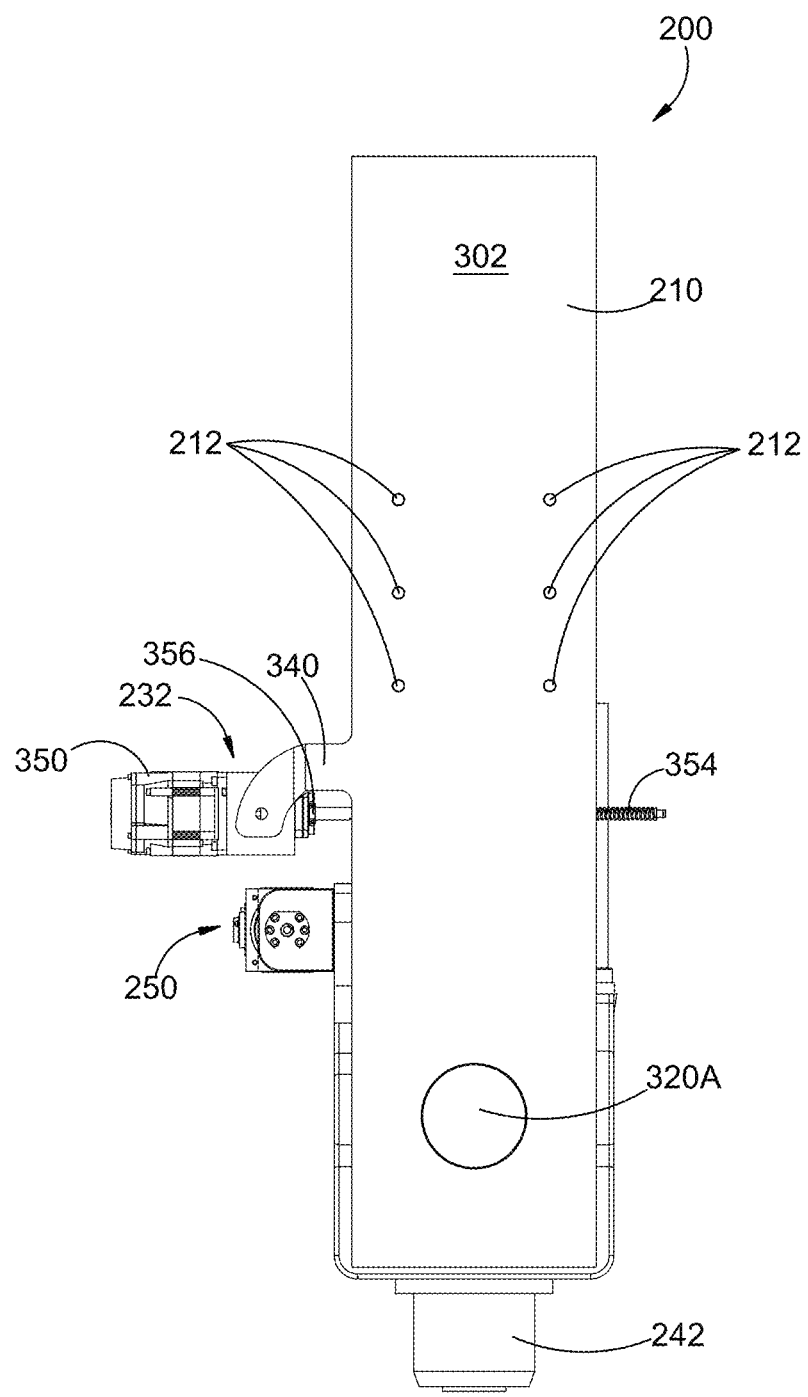
FIG. 8 is a rear elevation view of the adapter of FIG. 2.
Figure 9:
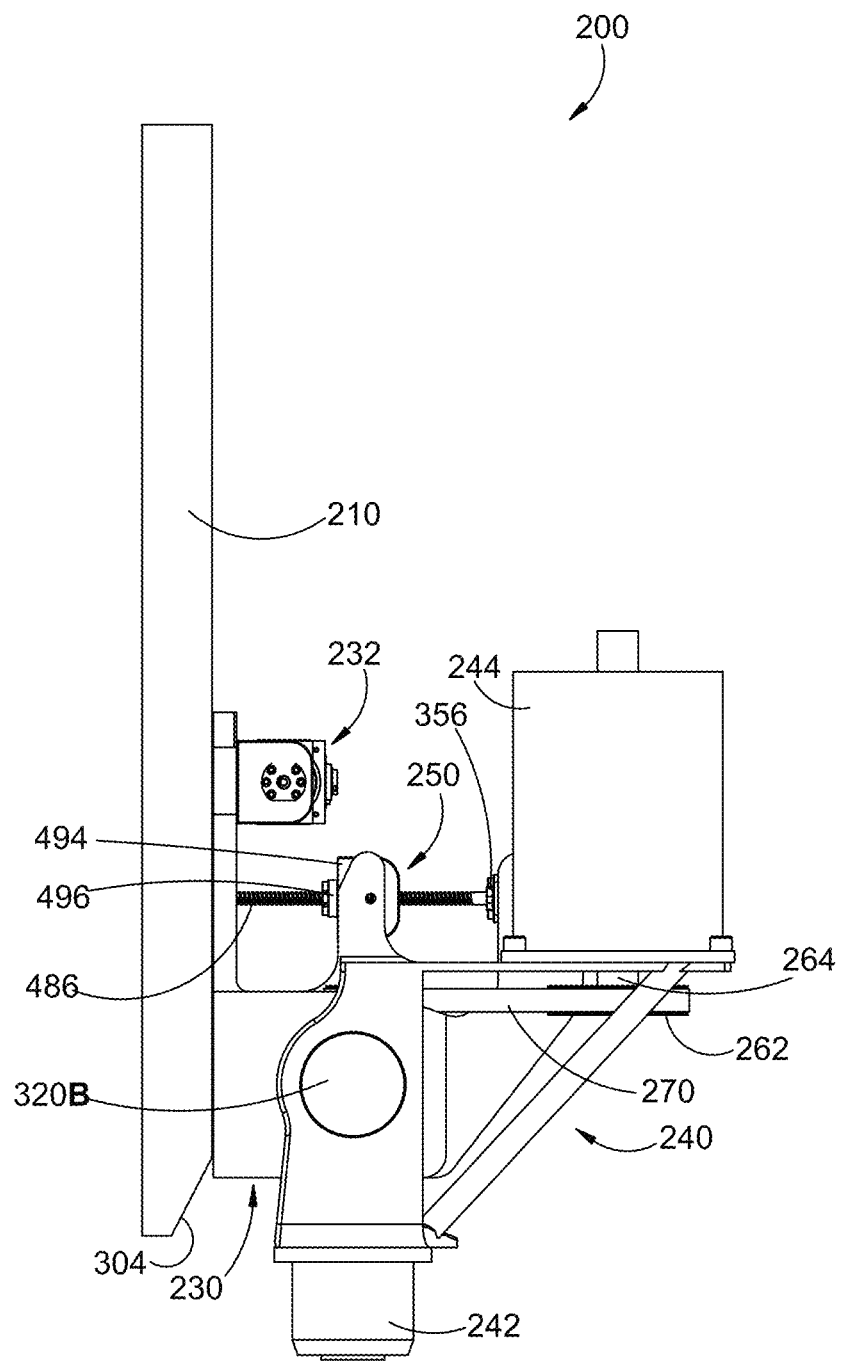
FIG. 9 is a left side elevation view of the adapter of FIG. 2.
Figure 13A:
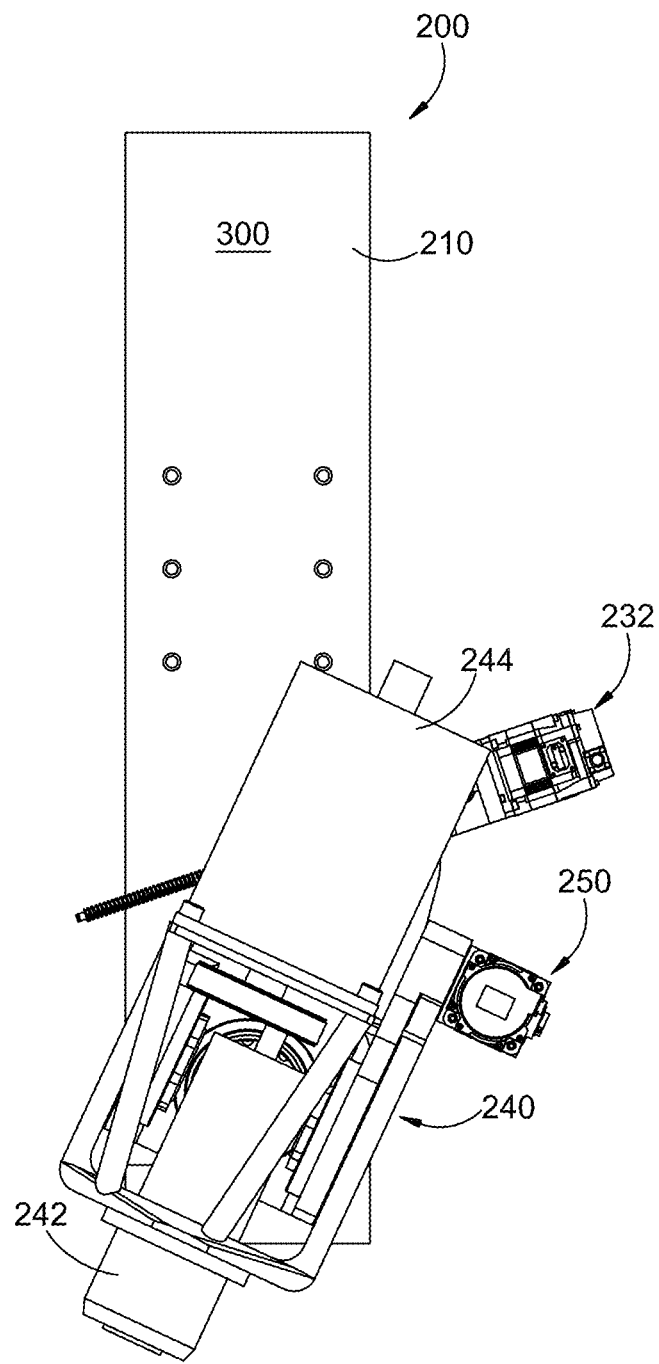
FIG. 13A is a front elevational view of the adapter of FIG. 2 that illustrates the installed adapter with the A-axis gimbal rotated clockwise (as viewed in FIG. 13A) about the A-axis to a first A-axis rotated position.
Figure 13B:
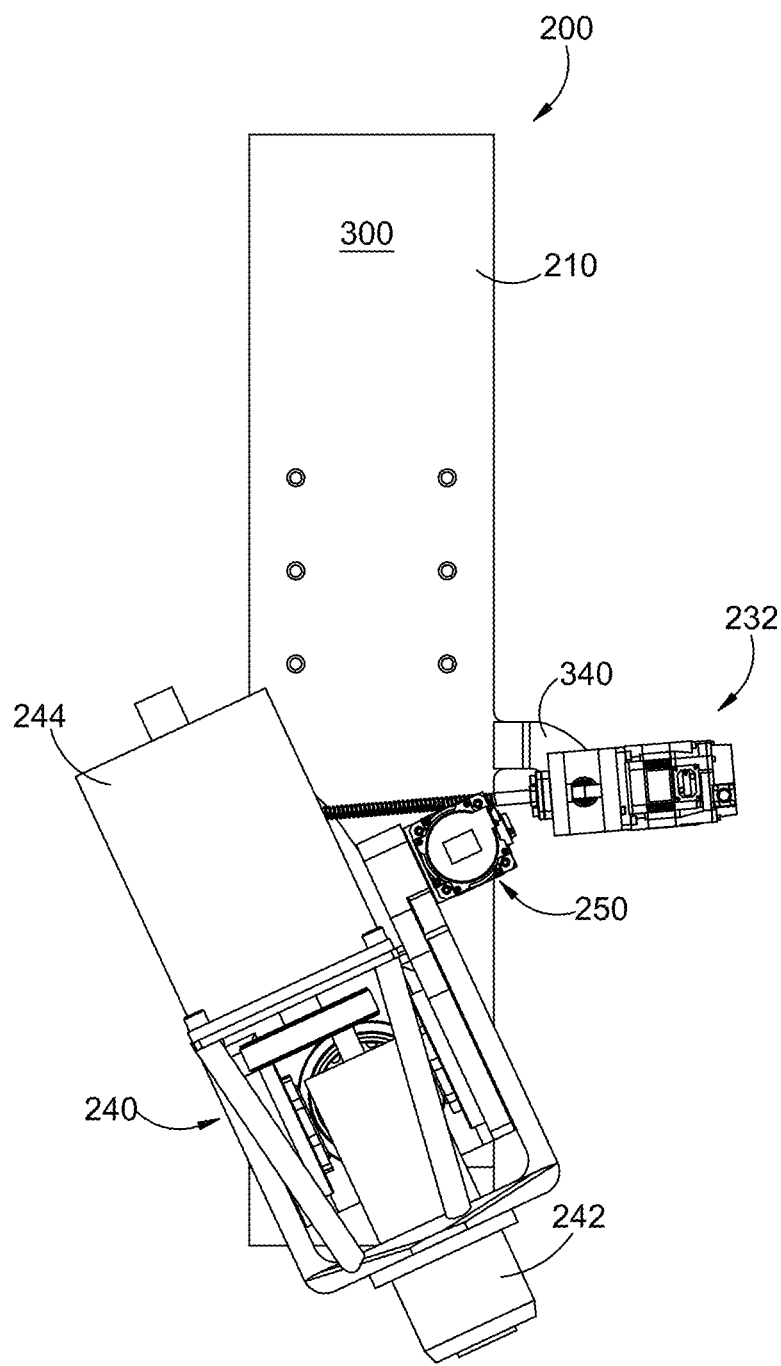
FIG. 13B is a front elevational view of the adapter of FIG. 2 that illustrates the installed adapter with the A-axis gimbal rotated counterclockwise (as viewed in FIG. 13B) about the A-axis to a second A-axis rotated position.

As shown in front elevational views in FIGS. 13A and 13B, the A-axis gimbal assembly 230 enables the tool chuck 116 and the attached tool 118 to be rotated with respect to the base platform 210. For example, FIG. 7 illustrates the unrotated A-axis gimbal assembly in an initial vertical orientation. FIG. 13A illustrates the A-axis gimbal assembly rotated approximately 25 degrees clockwise from the initial vertical orientation. FIG. 13B illustrates the A-axis gimbal assembly rotated approximately 25 degrees counterclockwise from the initial vertical orientation.

Figure 10:
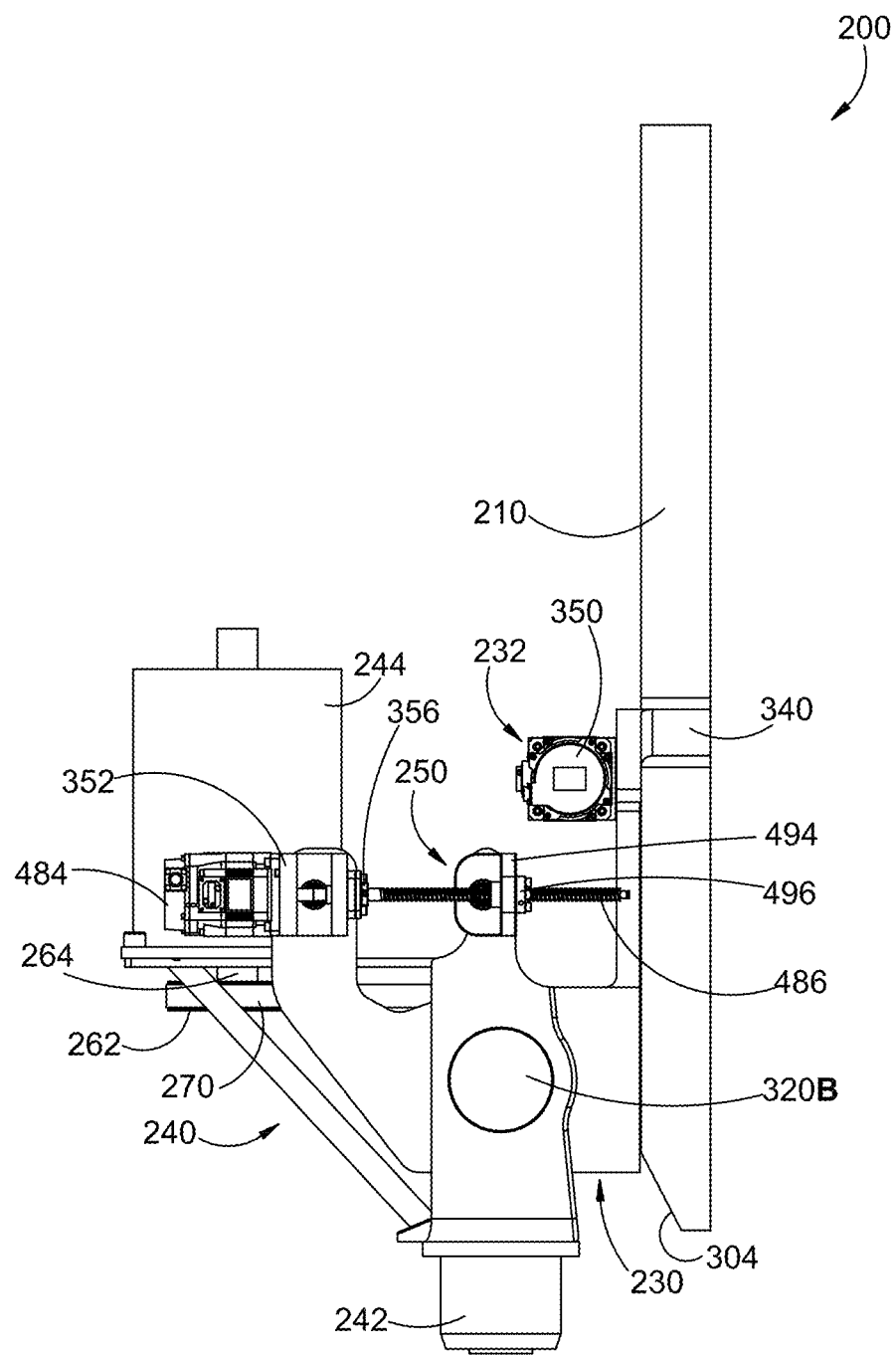
FIG. 10 is a right side elevation view of the adapter of FIG. 2.
Figure 11:
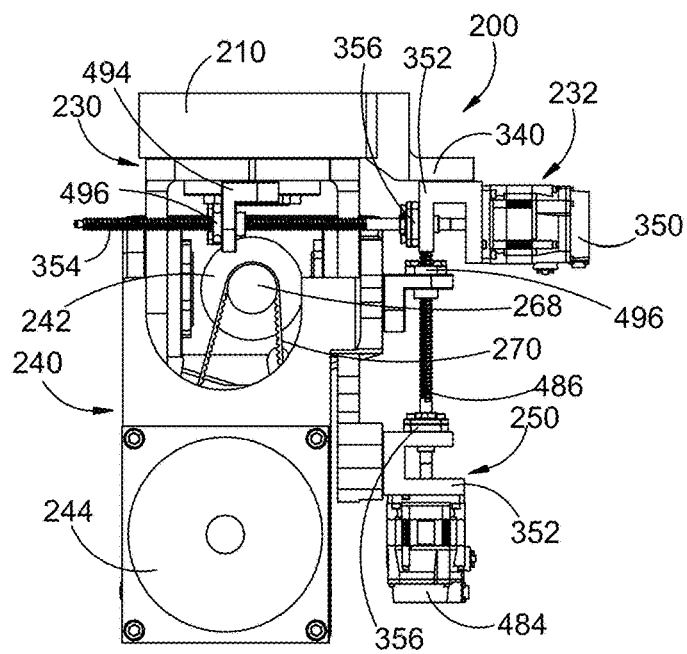
FIG. 11 is a top plan view of the adapter of FIG. 2.
Figure 12:
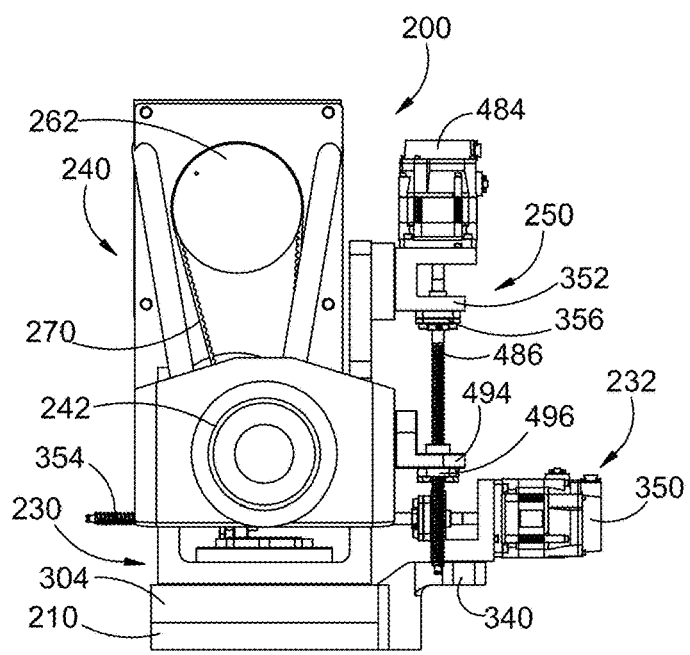
FIG. 12 is a bottom plan view of the adapter of FIG. 2.
Figure 14A:
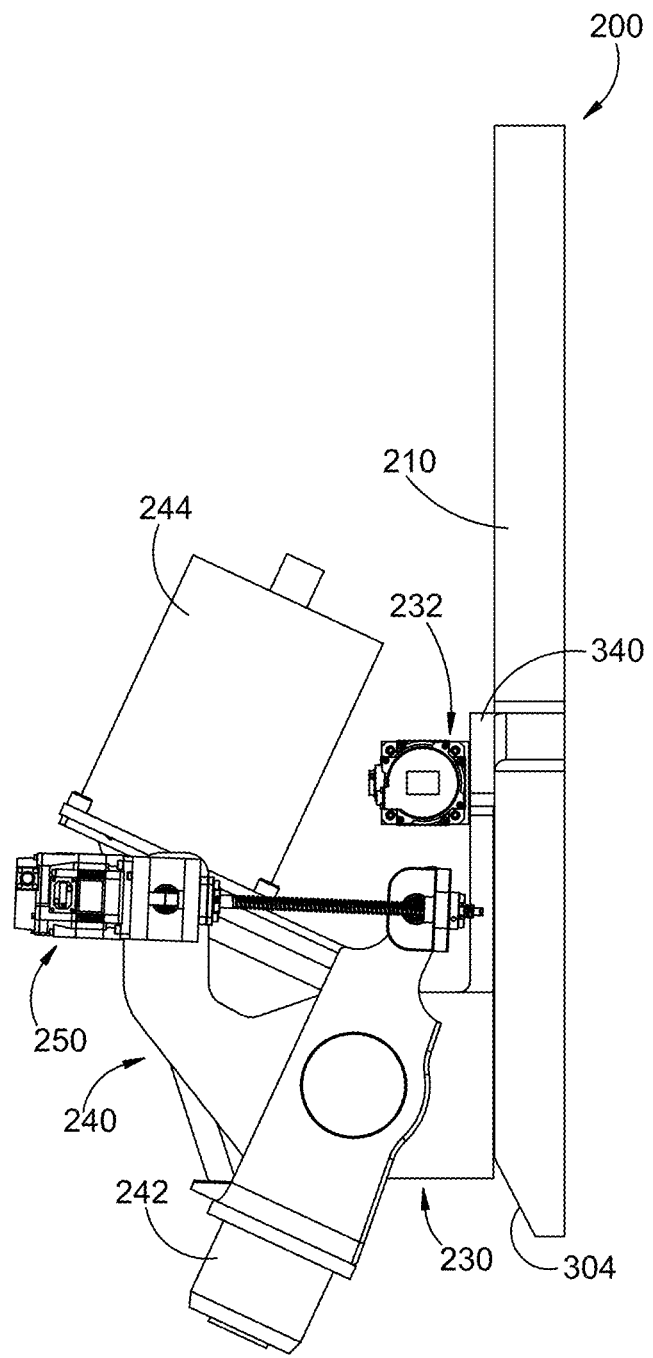
FIG. 14A is a right side elevational view of the adapter in FIG. 2 that illustrates the installed adapter with the B-axis gimbal rotated clockwise (as viewed in FIG. 14A) about the B-axis to a first B-axis rotated position.
Figure 14B:
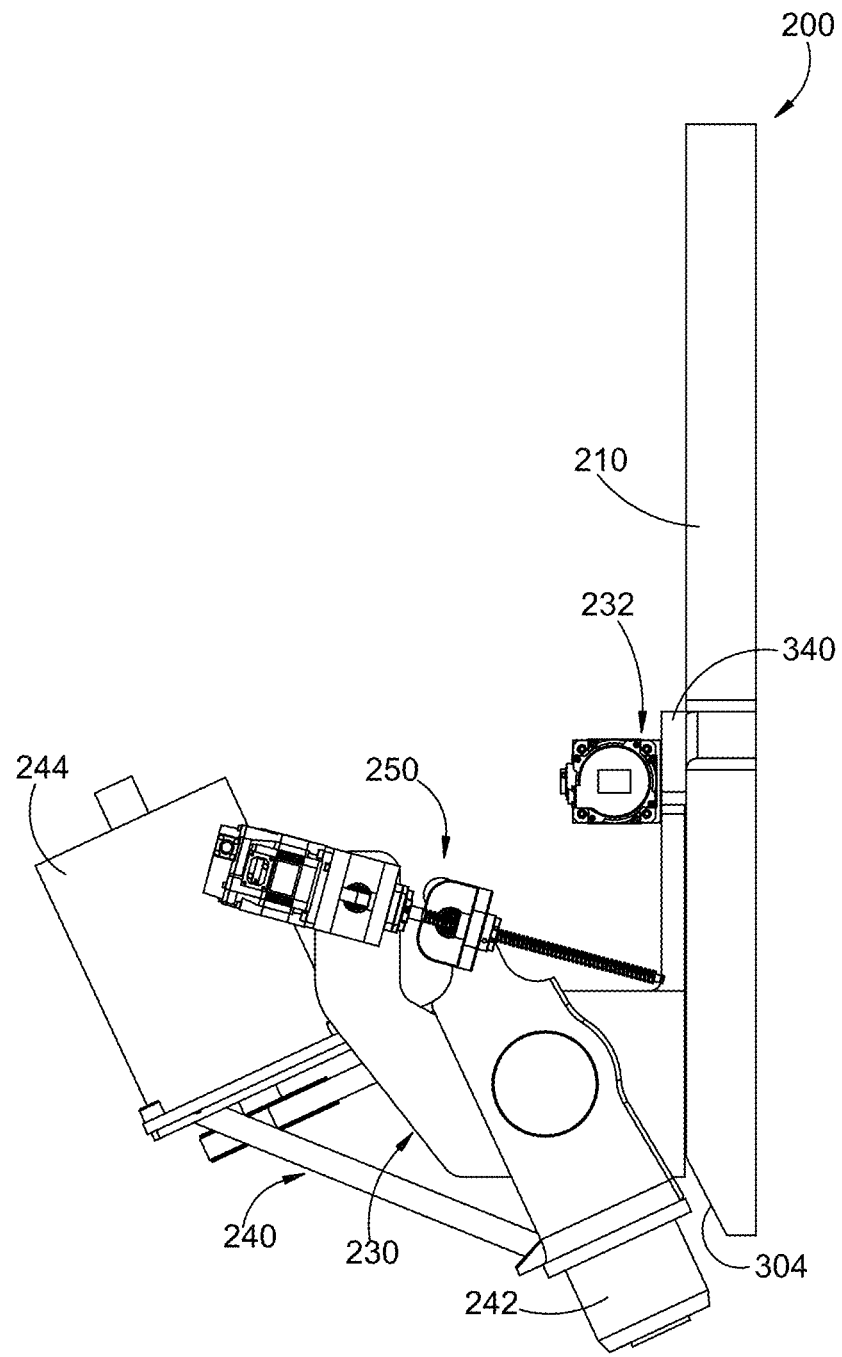
FIG. 14B is a front elevational view of the adapter in FIG. 2 that illustrates the installed adapter with the B-axis gimbal rotated counterclockwise (as viewed in FIG. 14B) about the B-axis to a second B-axis rotated position.

The B-axis gimbal assembly 240 is mounted to the A-axis gimbal assembly 230. The B-axis gimbal assembly rotates about the B-axis with respect to the A-axis gimbal assembly as illustrated in right side elevational views in FIGS. 14A and 14B. In each of FIGS. 14A and 14B, the A-axis gimbal assembly is not rotated and is in the initial vertical orientation shown in FIG. 7. In FIG. 10, the B-axis gimbal assembly is shown in an unrotated initial orientation wherein the spindle 242, the tool chuck 116 and the tool 118 are in a plane parallel to the base platform 210. In FIG. 14A, the B-axis gimbal assembly is rotated approximately 25 degrees clockwise such the lower end of the spindle and the tool chuck are rotated away from the base platform. In FIG. 14B, the B-axis gimbal assembly is rotated approximately 25 degrees counterclockwise such that the lower end of the spindle and the tool chuck are rotated toward the base platform.

Figure 15A:
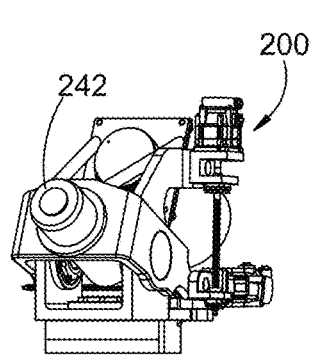
FIG. 15A-15I illustrate various positions of the adapter in FIG. 2 to show a potential range of motion.
Figure 15B:
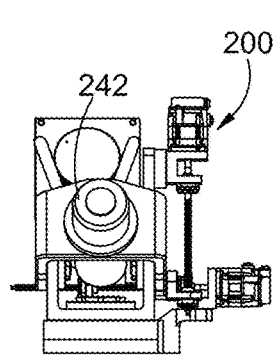
Figure 15C:
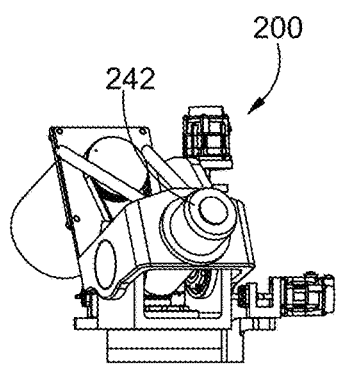
Figure 15D:
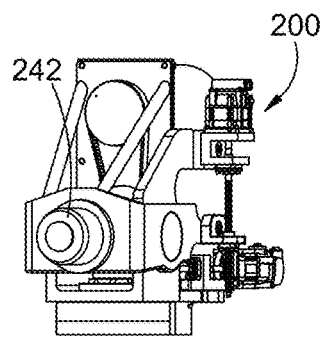
Figure 15E:
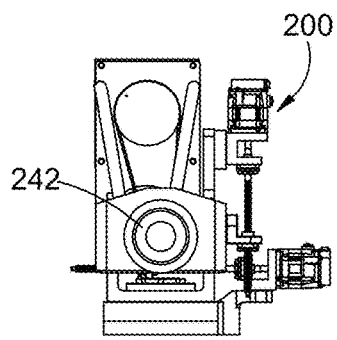
Figure 15F:
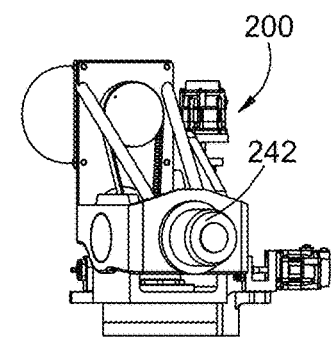
Figure 15G:
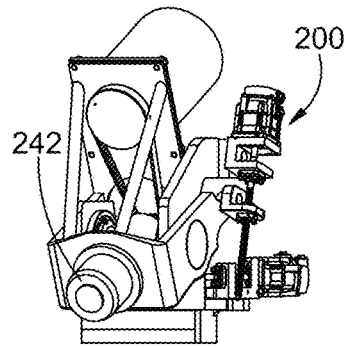
Figure 15H:
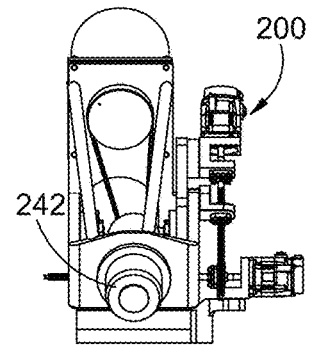
Figure 15I:
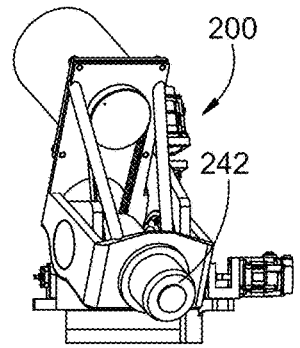

As illustrated in bottom plan views in FIGS. 15A-15I, the A-axis gimbal assembly 230 and the B-axis gimbal assembly 240 can be rotated together to position the spindle 242, the tool chuck 116 and the tool 118 at a combined angular position caused by the two rotations. For example, in FIG. 15E, the spindle is in a first centered position where neither gimbal assembly is rotated. In FIG. 15A, both gimbal assemblies are rotated to their respective maximum clockwise rotational positions. In FIG. 15I, both gimbal assemblies are rotated to their respective maximum counterclockwise positions.

The rotational ranges shown in FIGS. 13A-B, 14A-B and 15A-I are combinable with the horizontal movements of the gantry 104 and head support frame 106 along the X-axis and the Y-axis and with the vertical movements of the head support 110 along the Z-axis. For example, the tool 118 can form a bore in a part (not shown) at a desired angle by initially positioning the end of the tool against an outer surface of the part at the desired angle by selectively rotating the two gimbal assemblies 230, 240. While rotating the tool in a conventional manner, the movement of the gantry and head support frame in the X-axis and the Y-axis and the movement of the head support in the Z-axis are coordinated to move the tool in a straight line at the desired angle until the bore is formed to the desired depth.

FIGS. 16-38 illustrate the components of the adapter 200 in more detail.

Figure 16:
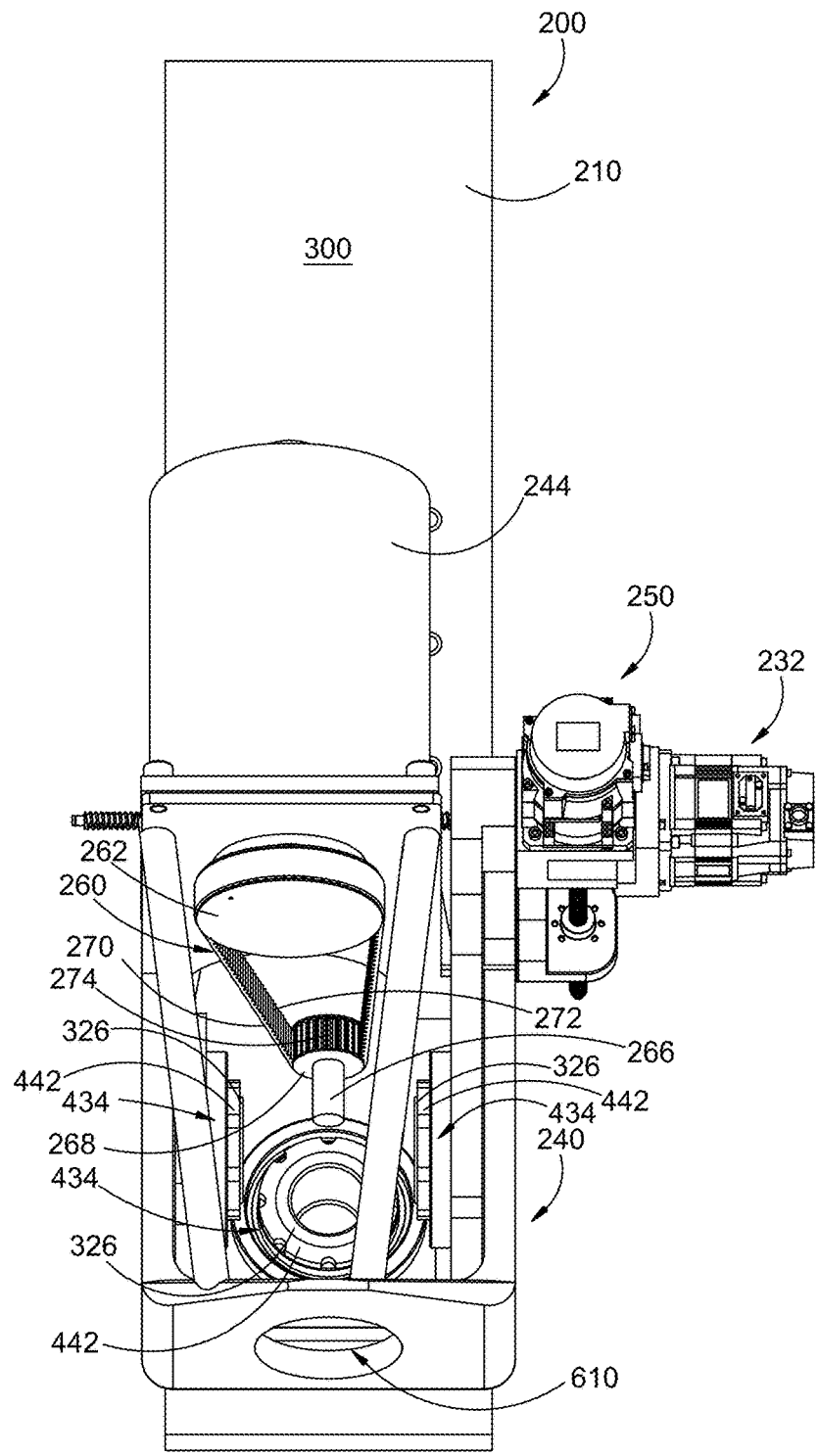
FIG. 16 is a front-bottom perspective view of the adapter in FIG. 2 with the spindle removed to show additional components.

FIG. 16 shows a front-bottom perspective view of the adapter 200 with the spindle 242 removed to show additional components. In the illustrated embodiment, the adapter includes a spindle drive system 260. The spindle drive system may include a motor pulley 262 connected to a motor drive shaft 264 of the motor 244. In some embodiments, the motor pulley may be indirectly connected to the motor drive shaft by any known coupling. A spindle drive shaft 266 may be disposed in the spindle 114 and may include a spindle pulley 268 mounted thereto. A power transfer element, such as a continuous drive belt 270, may connect the motor pulley and the spindle pulley such that rotation of the motor drive shaft causes corresponding rotation of the spindle drive shaft. Other non-limiting embodiments include a drive chain or other form of power transfer element. The drive belt may also be disposed directly on the motor drive shaft and the spindle drive shaft. In an exemplary embodiment, the drive belt may include a plurality of teeth 272 such that precise control of the rotation of the tool 118 may be performed without the drive belt slipping. Similarly, the motor pulley and the spindle pulley may include complementary teeth 274 to receive the drive belt teeth.

FIGS. 17A and 17B illustrate front and rear perspective views, respectively, of the base platform 210. The base platform is generally rectangular and includes an outer face 300 and an inner face 302 and includes the plurality of mounting through bores 212 extending from the outer face to the inner face. When installed on the head support 110 of the milling machine 100, as shown in FIG. 2, the inner face is positioned against the head support. The base platform has a width of approximately 10.5 inches and has a length (vertically in the drawings) of approximately 47.75 inches. The base platform has a thickness of approximately 3 inches between the two faces. A lower portion 304 of the outer face is chamfered to taper toward the inner face at an angle of approximately 26.5 degrees starting at a location approximately 3.3 inches from the bottom of the base platform. The chamfered lower portion provides clearance for the spindle 242 when the B-axis gimbal assembly 240 is rotated counterclockwise as shown in FIG. 14B.

As shown in FIG. 17B, the inner face 302 of the base platform 210 includes a circular inner recess 310 that extends to a depth of approximately 0.5 inch into the inner face. The recess is centered approximately 6 inches from the lower end of the base platform. A cylindrical through bore 312 is centered in the recess and extends through the base platform to the outer face 300. As shown in FIG. 17A, the outer face includes a circular outer recess 314 that extends to a depth of approximately 0.5 inch into the outer face. In the illustrated embodiment, the circular recesses each include an inner diameter of approximately 4.5 inches, and the through bore has an inner diameter of approximately 3.5 inches.

Figure 18:
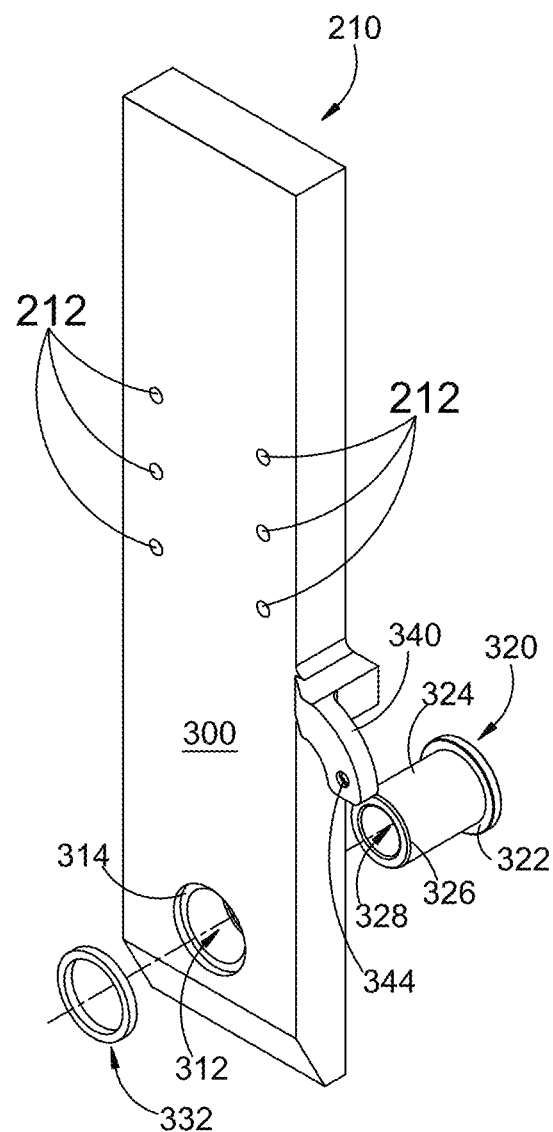
FIG. 18 is a perspective view of the base platform of FIG. 17A with a bearing support bolt and spacer exploded therefrom.

As shown in FIG. 18, an A-axis bearing support bolt 320A extends through the through bore 312 of the base platform 210 from the inner face 302 to the outer face 300. The A-axis bearing support bolt has a flange 322 having an outer diameter corresponding to the inner diameter of the inner recess 310 and having a thickness corresponding to the depth of the inner recess. The A-axis bearing support bolt has a cylindrical body 324 that extends from the flange to a threaded outer end 326. The A-axis bearing support bolt has a length of approximately 4.7 inches from the flange to the outer end. The cylindrical body has an outer diameter that corresponds to the inner diameter of the through bore. A cylindrical cavity 328 may be formed in the A-axis bearing support bolt from the threaded outer end to a depth of approximately 2.75 inches. The cavity has an inner diameter of approximately 2.4 inches. In an exemplary embodiment, the A-axis bearing support bolt is press fit into the recess and the through bore such that an exposed surface 330 of the flange is flush with the inner face of the base platform. In the illustrated embodiment, a circular spacer 332 is received in the outer recess 314 of the base platform. The circular spacer may extend beyond the outer face of the base platform by a selected distance such that the A-axis gimbal assembly 230 does not engage the outer face of the base platform.

The base platform 210 further includes a pivot mount 340 positioned on the right side (as viewed in FIG. 17A). A lower edge of the pivot mount is located approximately 23 inches from the bottom of the base platform 210. The pivot mount has a substantially square cross section at the inner face 302 of the base platform and extends approximately 4 inches such that an extended portion 342 of the pivot mount extends beyond the outer face 300 by approximately 1 inch. The extended portion also extends horizontally away from the outer face by approximately 2 inches such that the upper end of the pivot mount forms a two-inch by four-inch block. A through bore 344 is formed through the extended portion of the pivot mount approximately 1 inch from the outer edge of the extended portion and midway between the upper and lower edges of the extended portion. In the illustrated embodiment, an inner portion 346 of the pivot mount is chamfered to a distance of approximately 0.75 inch.

In the illustrated embodiment, the A-axis positioning system 232 includes an A-axis motor 350 rotatably mounted to the pivot mount 340. In an exemplary embodiment, a fastener (not shown) passes through a corresponding U-shaped bracket 352 and engages the through bore 344 of the pivot mount to rotatably connect the U-shaped bracket to the pivot mount. Preferably, bearings (not shown) are included to allow the U-shaped bracket to pivot freely with respect to the pivot mount.

The A-axis motor 350 may be rigidly mounted to the U-shaped bracket 352 with any appropriate fasteners. A leadscrew 354 is coupled to the A axis motor such that the motor may drive the leadscrew in a clockwise or counterclockwise rotation. The leadscrew lies in a first plane passing longitudinally through the leadscrew in a vertical orientation. The first plane is orthogonal to the A-axis. In some embodiments, the A-axis motor is an electrical stepper motor. In particular exemplary embodiments, the A-axis motor provides precise rotation of the leadscrew without significant mechanical backlash. In an exemplary embodiment, a screw support bearing 356 is fixedly mounted to the U-shaped bracket. The leadscrew is received in the screw support bearing such that the leadscrew is rotatably supported by the screw support bearing. In a particular embodiment, the screw support bearing may be one of the FK/FF bearing series manufactured by HIWIN Technologies Corp. with its global headquarters in Taichung, Taiwan.

The A-axis gimbal assembly 230 comprises an A-axis frame 400 (shown in FIGS. 19-27) that includes a base plate 402, a left side plate 404 and a right side plate 406. The two side plates are perpendicular to the base plate. In the illustrated embodiment, the A-axis frame comprises stainless steel having a thickness of approximately 1 inch. The A-axis frame has an overall width of approximately 9.865 inches at a lower end 410. A lower portion 412 of the base plate of the A-axis frame is generally rectangular to a height of approximately 8 inches. An upper portion 414 of the base plate of the A-axis frame tapers inward at an angle of approximately 20 degrees on each side for an additional height of approximately 8.23 inches such that an upper end of the A-axis frame has a width of approximately 3.9 inches. The left side plate and the right side plate 406 extend from each side of the lower portion of the base plate for a distance of approximately 9 inches. The left side plate has a left inner wall 420. The right side plate has a right inner wall 422. The two inner walls are parallel and are spaced apart from each other by a distance of approximately 7.865 inches.

A forward upper portion 424 of the left side plate 404 is chamfered at an angle of approximately 19.25 degrees for a distance of approximately 2.863 inches. A corresponding forward upper portion 426 of the right side plate 406 is also chamfered in a like manner.

The base plate 402 includes a through bore 430 that is positioned substantially in the center of the lower portion 412 of the frame (e.g., approximately 8 inches from the lower end 410 and midway between the left inner wall 420 and the right inner wall 422. The through bore has a diameter of approximately 4.5 inches in the illustrated embodiment. The through bore is surrounded by a circular recess 432. The through bore extends from a front face 431 of the base plate to a rear face 433 of the base plate. The circular recess has a diameter of approximately 6.3 inches and has a depth of approximately 0.4 inch into the front face.

Figure 21:
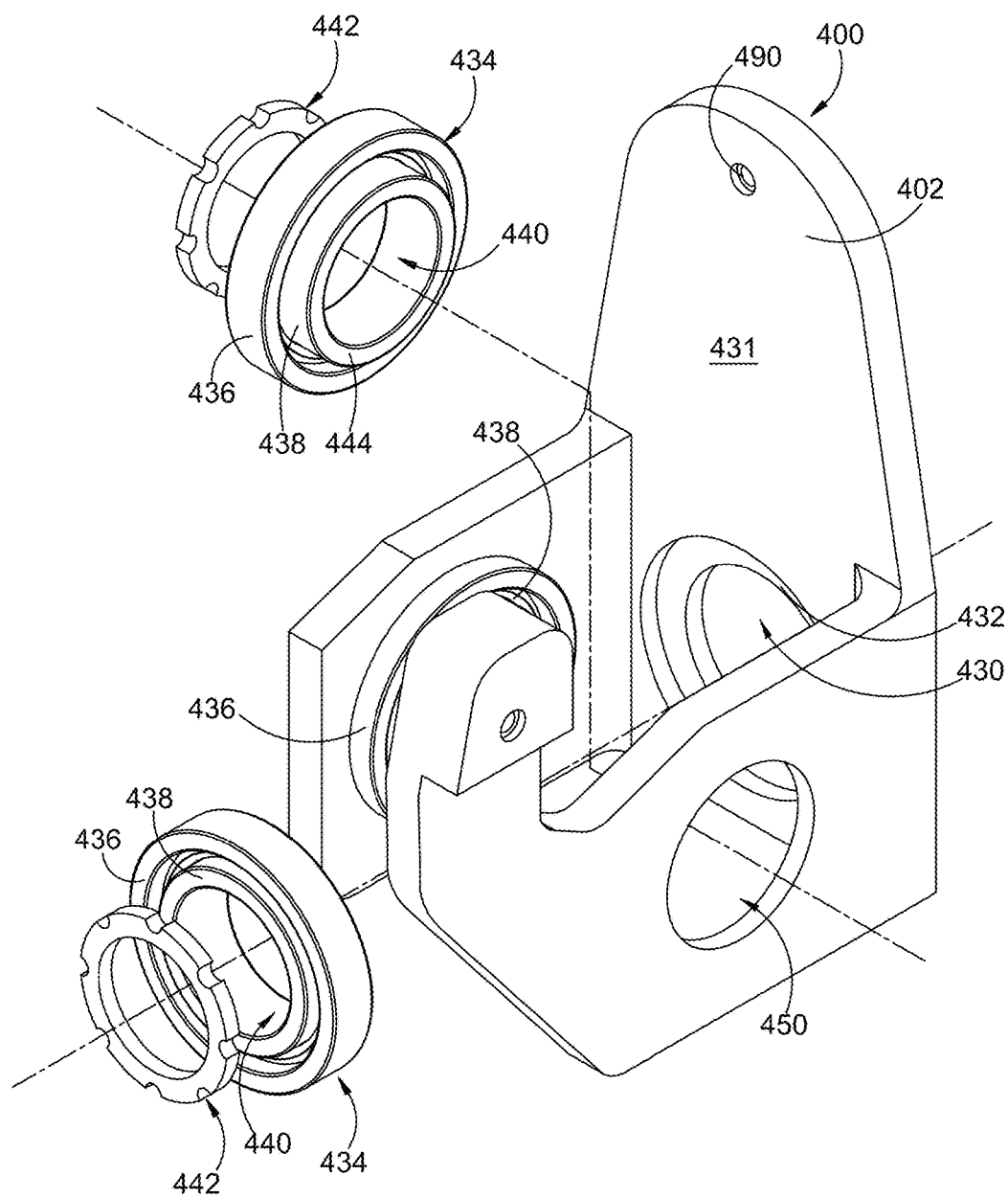
FIG. 21 is a top-front-right perspective view of the A-axis frame of FIG. 19 with bearings and retaining nuts exploded therefrom.
Figure 22:
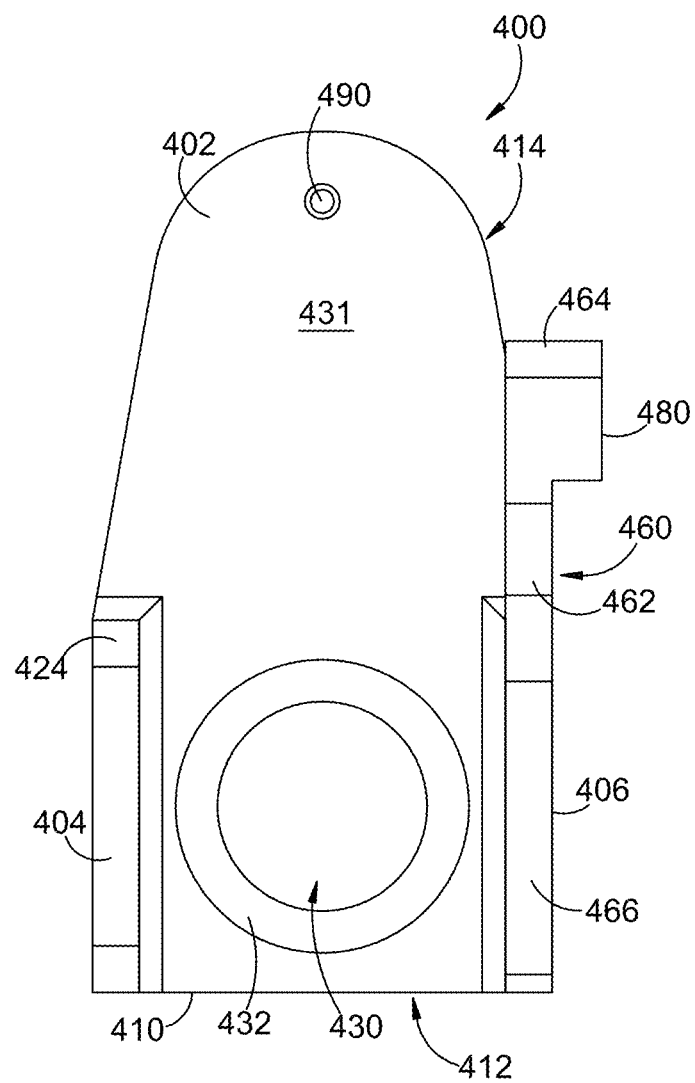
FIG. 22 is a front elevation view of the A-axis frame of FIG. 19.
Figure 23:
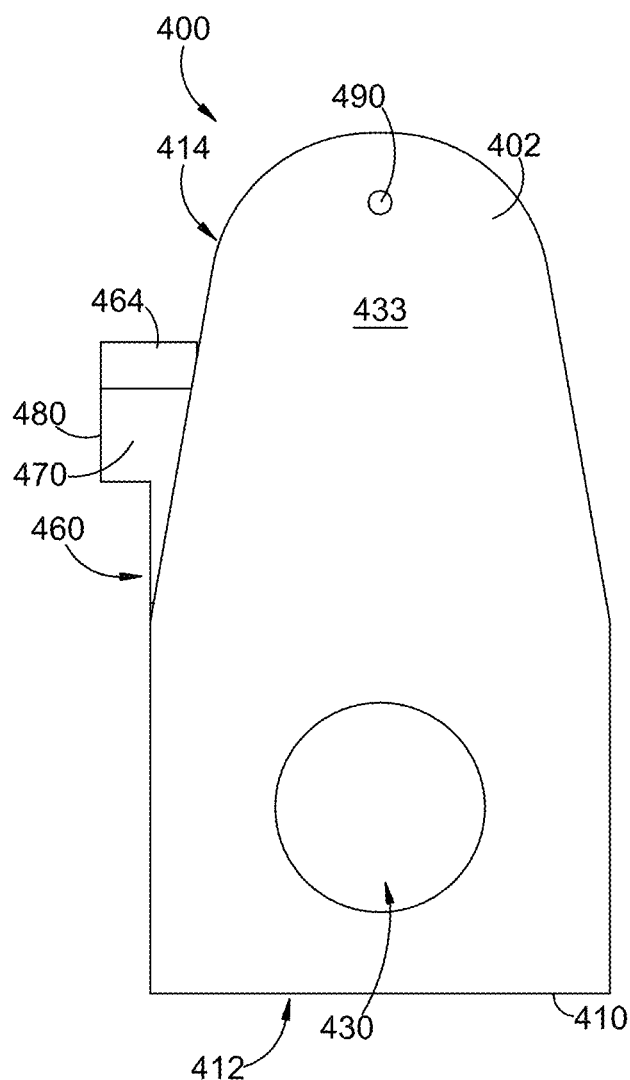
FIG. 23 is a rear elevation view of the A-axis frame of FIG. 19.
Figure 24:
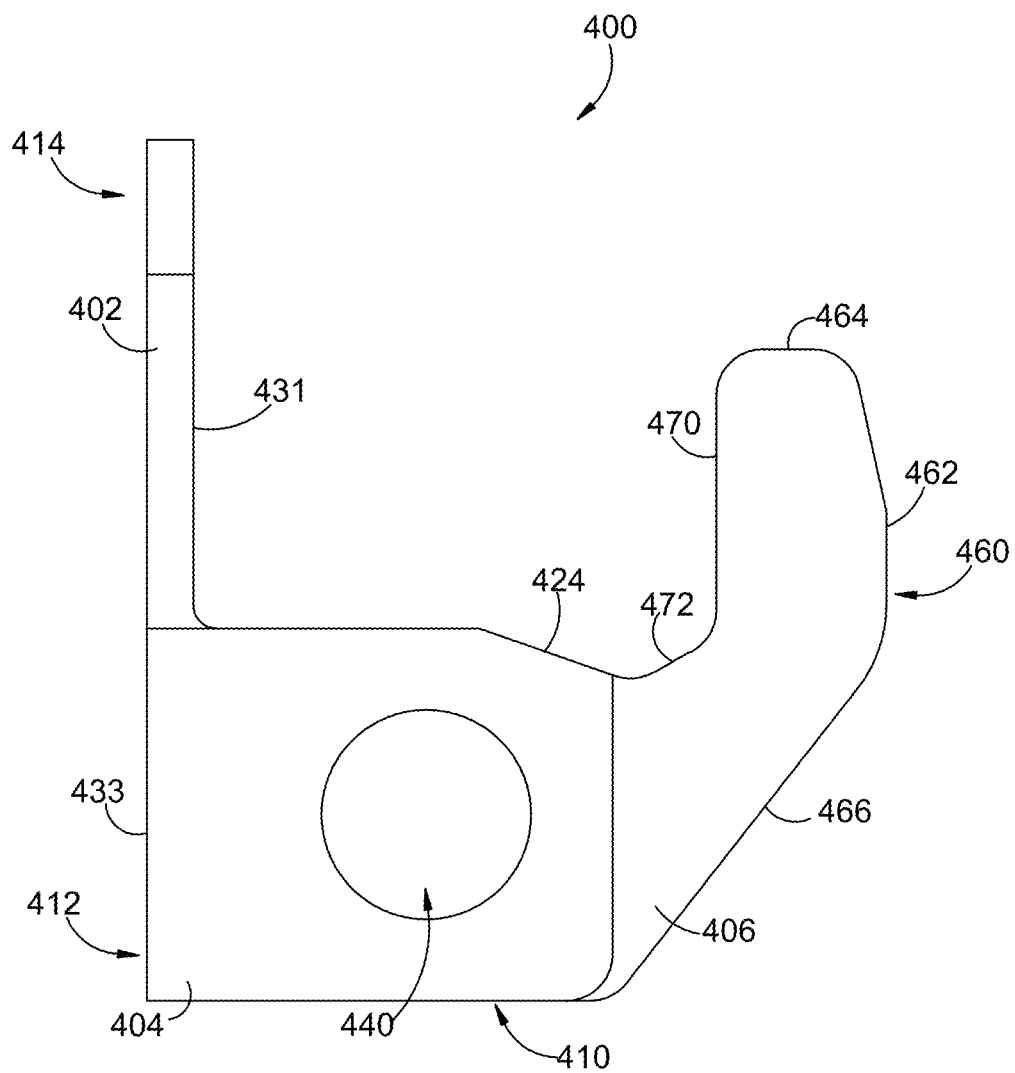
FIG. 24 is a left side elevation view of the A-axis frame of FIG. 19.
Figure 25:
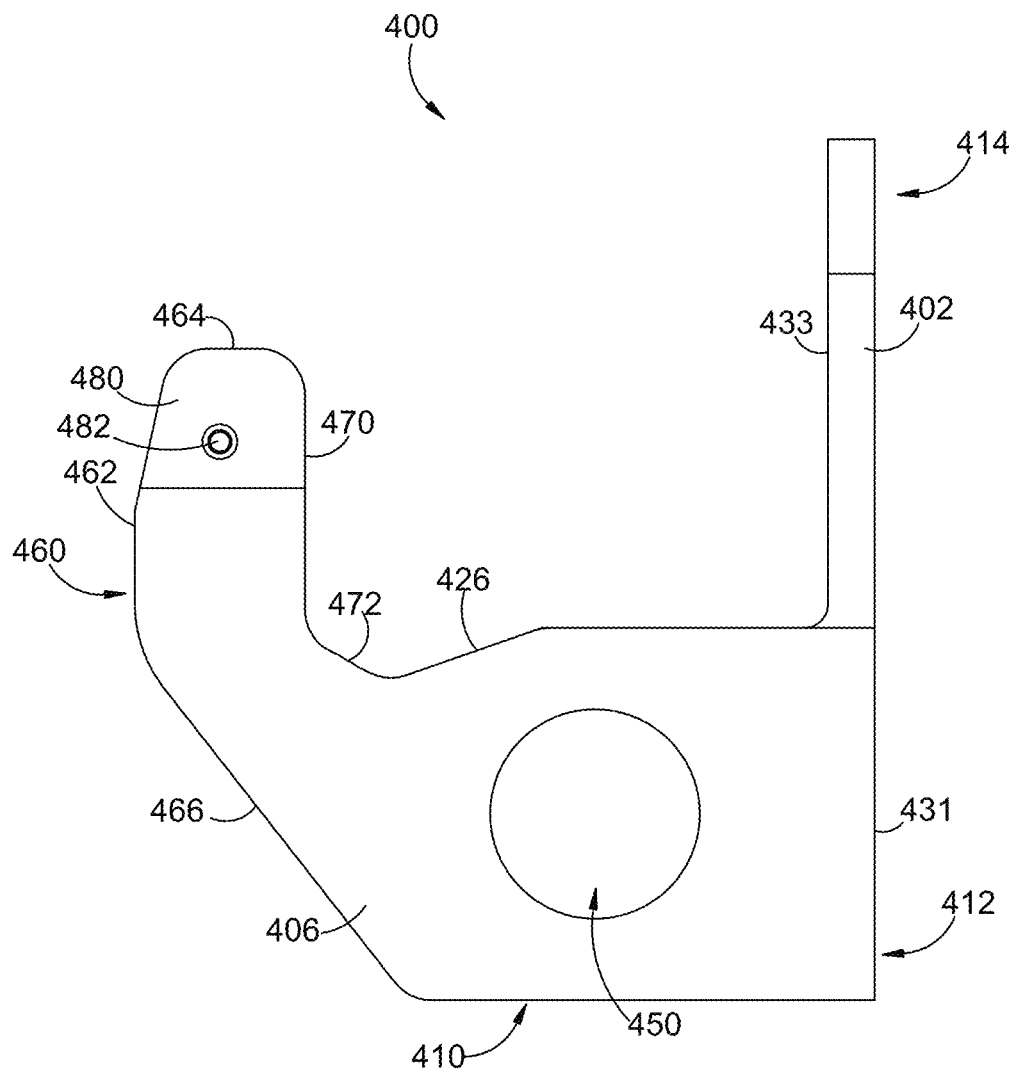
FIG. 25 is a right side elevation view of the A-axis frame of FIG. 19.
Figure 26:
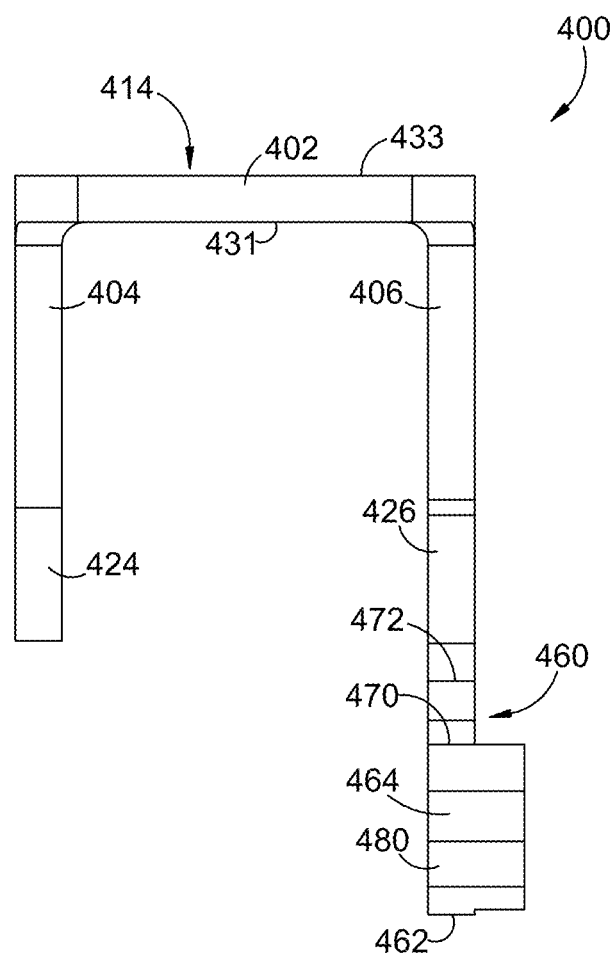
FIG. 26 is top plan view of the A-axis frame of FIG. 19.
Figure 27:
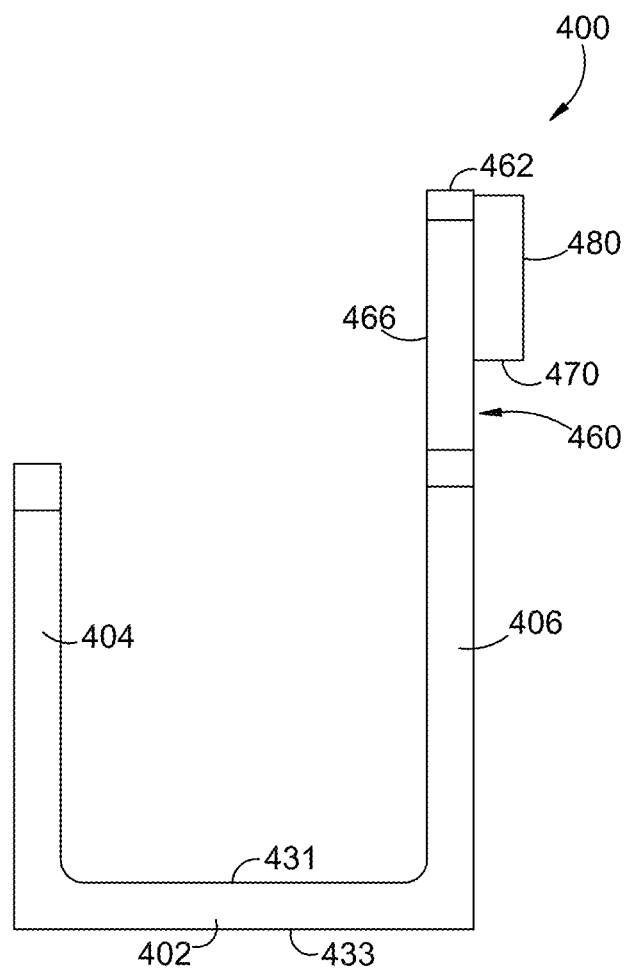
FIG. 27 is a bottom plan view of the A-axis frame of FIG. 19.
Figure 28:
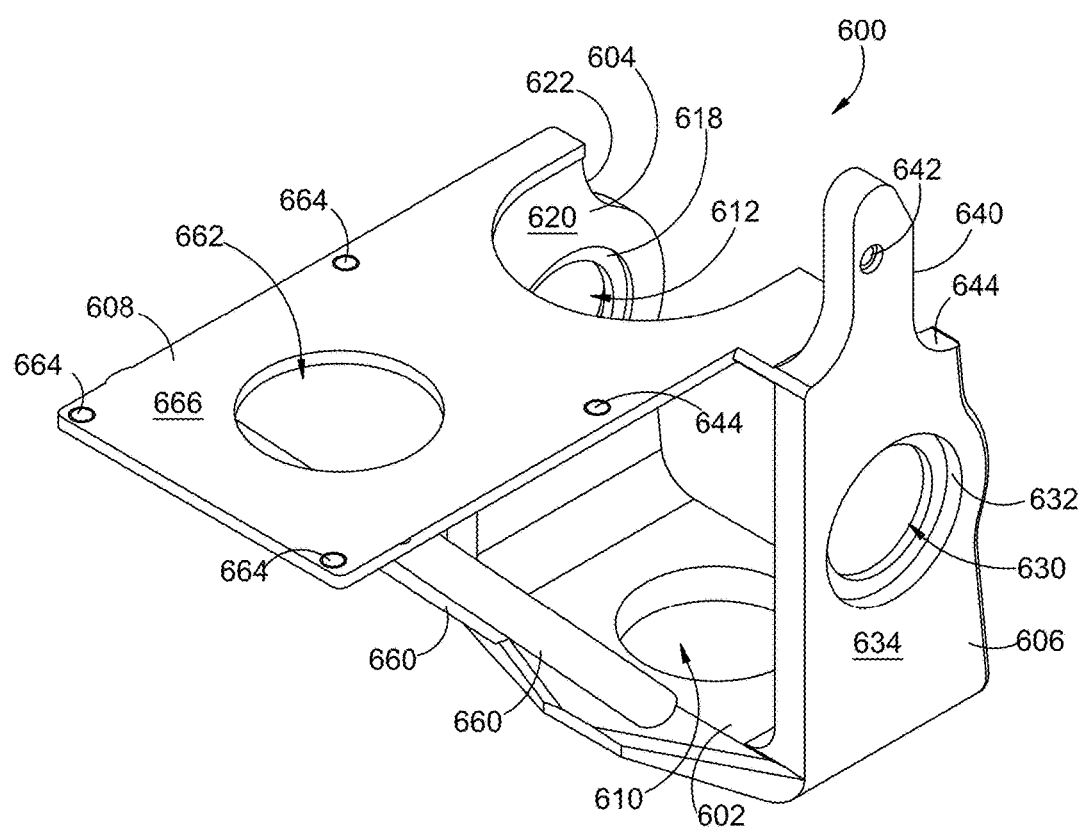
FIG. 28 is a top-front-right perspective view of the B-axis frame.
Figure 29:
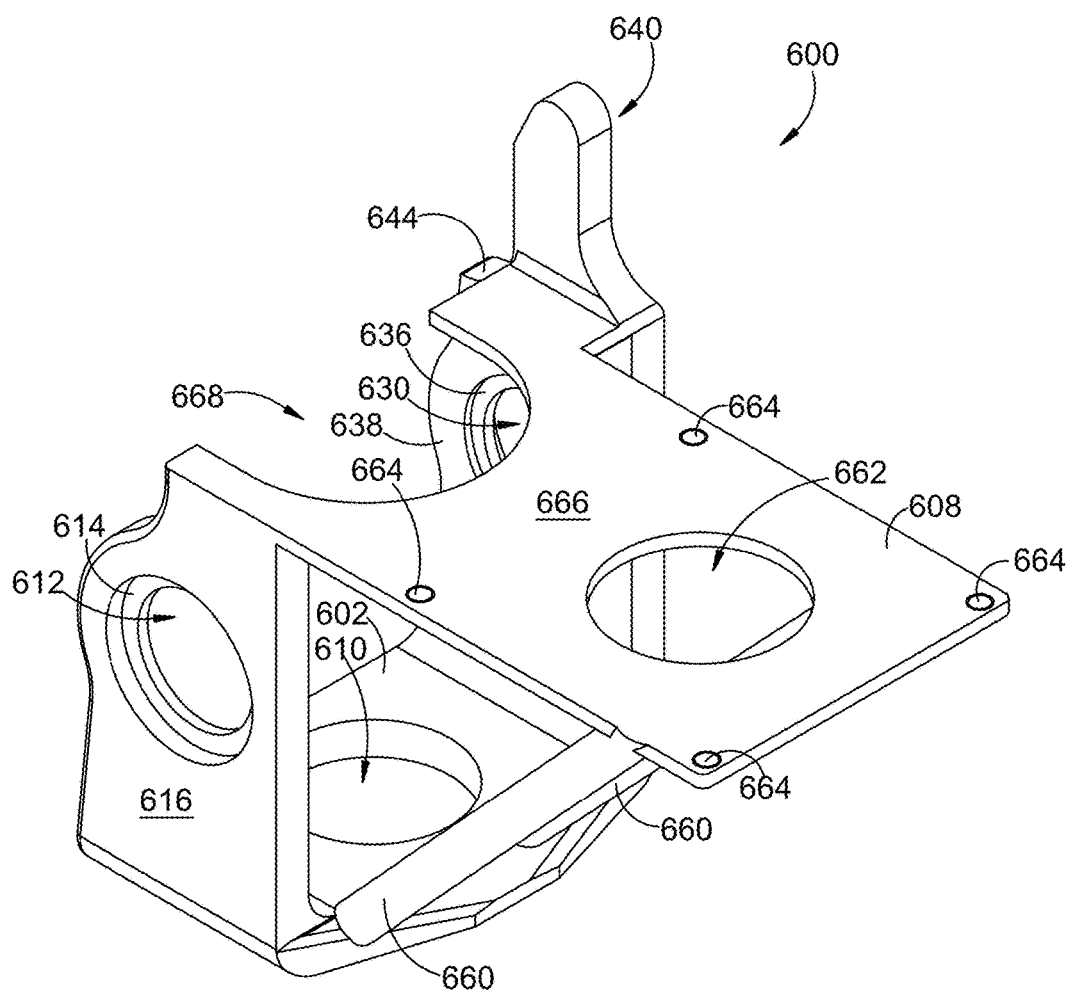
FIG. 29 is a top-front-left perspective view of the B-axis frame of FIG. 28.
Figure 30:
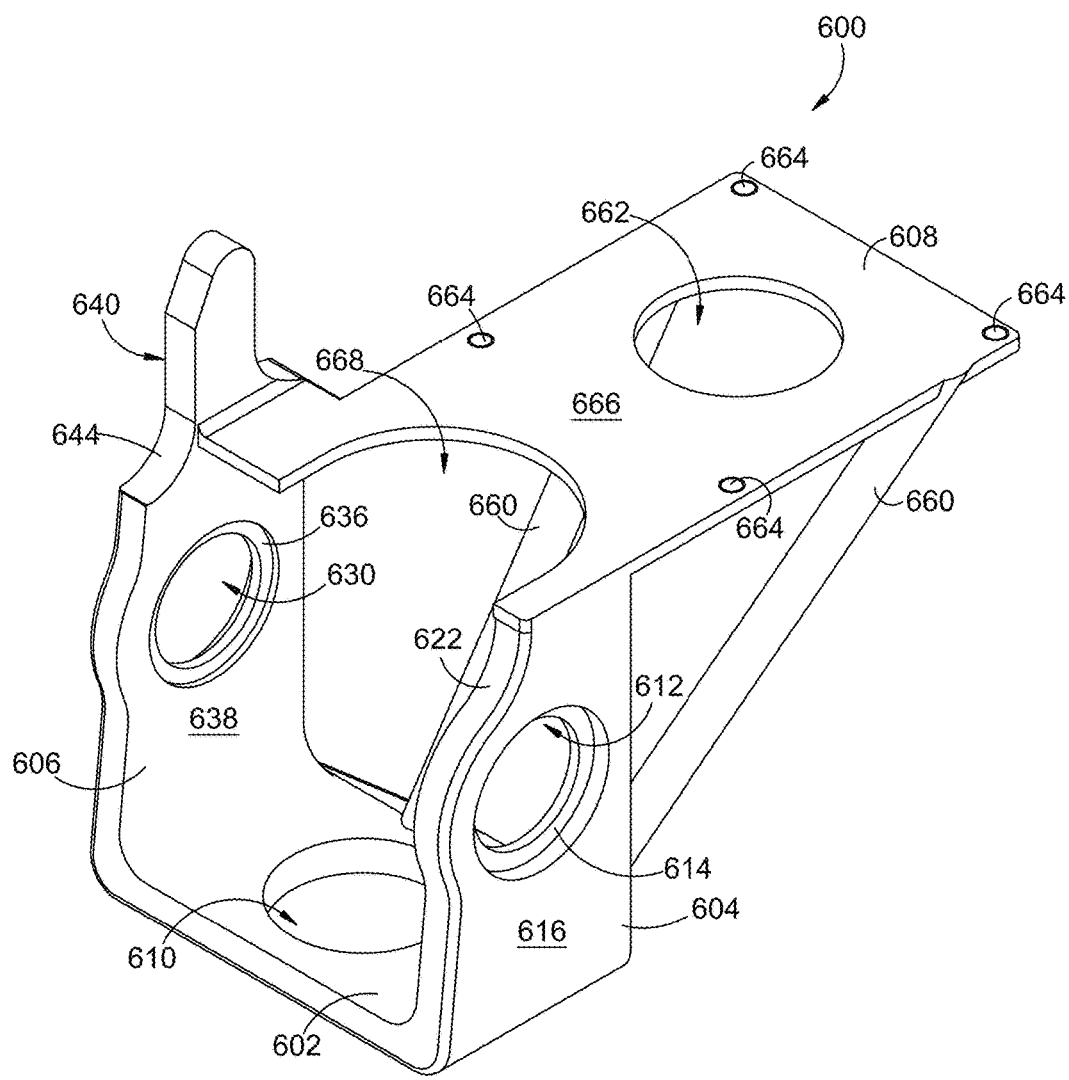
FIG. 30 is a top-back-left perspective view of the B-axis frame of FIG. 28.
Figure 31:
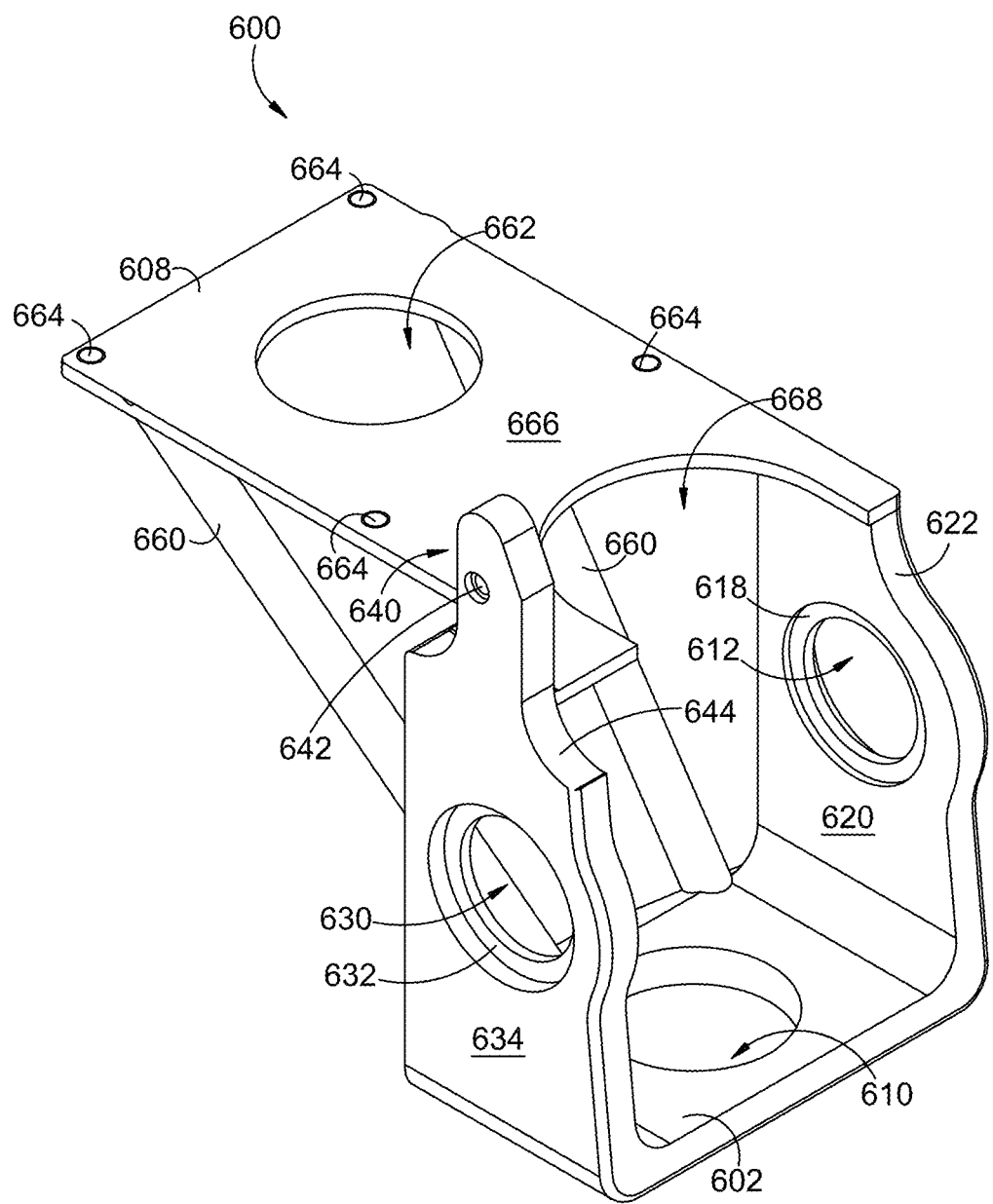
FIG. 31 is a top-back-right perspective view of the B-axis frame of FIG. 28.

As shown in FIG. 21, a bearing assembly 434 including an outer track 436 and an inner track 438 is received in the circular recess 432. The outer track is sized such that its outer diameter is substantially similar to the diameter of the circular recess. In an exemplary embodiment, the bearing assembly may be press fit into the circular recess. The inner track may be sized such that its inner diameter is substantially similar to the outer diameter of the cylindrical body 324 of the A-axis bearing support bolt 320A. The inner track receives the cylindrical body in an inner passage 440. In some non-limiting embodiments, the cylindrical body may, is press fit in the inner passage. In an exemplary embodiment, a retaining nut 442 engages the threaded outer end 326 of the A-axis bearing support bolt once the A-axis frame 400 has been assembled with the base platform 210. The retaining nut maintains the fixed connection of the inner track of the bearing assembly with the A-axis bearing support bolt such that the rotation of the A-axis frame is allowed by the function of the bearing assembly. In such an embodiment, the retaining nut and the A-axis bearing support bolt force a rear face 444 of the inner track against the spacer 332 received in the outer recess 314 of the base platform.

The left side plate 404 includes a left side plate through bore 446 positioned substantially in the center of the left side plate vertically (e.g., approximately 4 inches from the lower edge of the left side plate) and approximately 5 inches from the base plate 402 horizontally. The through bore has a diameter of approximately 4.5 inches in the illustrated embodiment. The through bore is surrounded by a circular recess 448 formed in the left inner wall 420. The circular recess has a diameter of approximately 6.3 inches and has a depth of approximately 0.5 inch.

The right side plate 406 includes a right side plate through bore 450 positioned substantially in the center of the right side plate vertically (e.g., approximately 4 inches from the lower edge of the right side plate) and approximately 5 inches from the base plate 402 horizontally. The through bore has a diameter of approximately 4.5 inches in the illustrated embodiment. The through bore is surrounded by a circular recess 452 formed in the right inner wall 422. The circular recess has a diameter of approximately 6.3 inches and has a depth of approximately 0.5 inch. The center of the right side plate through bore is aligned with the left side plate through bore 440 along a common axis.

Both the left side plate through bore 444 and the right side plate through bore 450 receive a corresponding bearing assembly 434 in a similar manner as described above. In an exemplary embodiment, the bearing assemblies are press fit into the corresponding through bores. The bearing assemblies may be of differing shapes and sizes, but a preferred embodiment includes the bearing assemblies of a common size and model.

Figure 19:
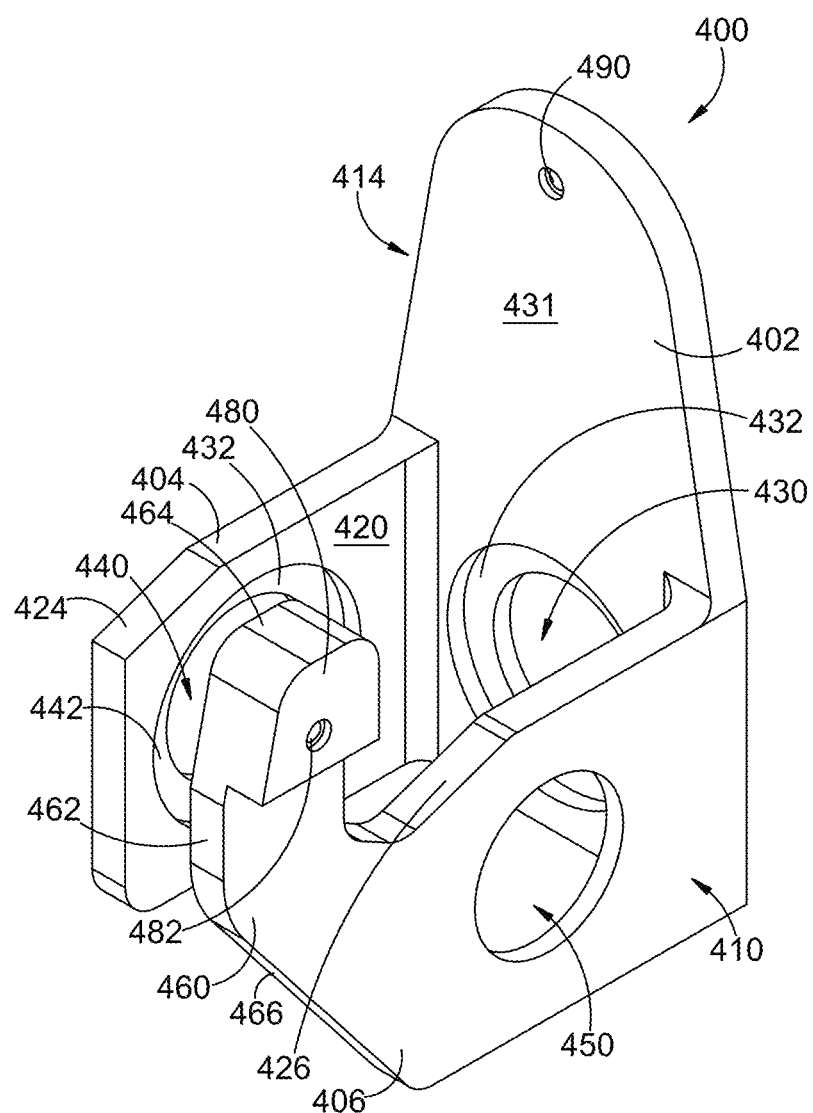
FIG. 19 is a top-front-right perspective view of the A-axis frame.
Figure 20:
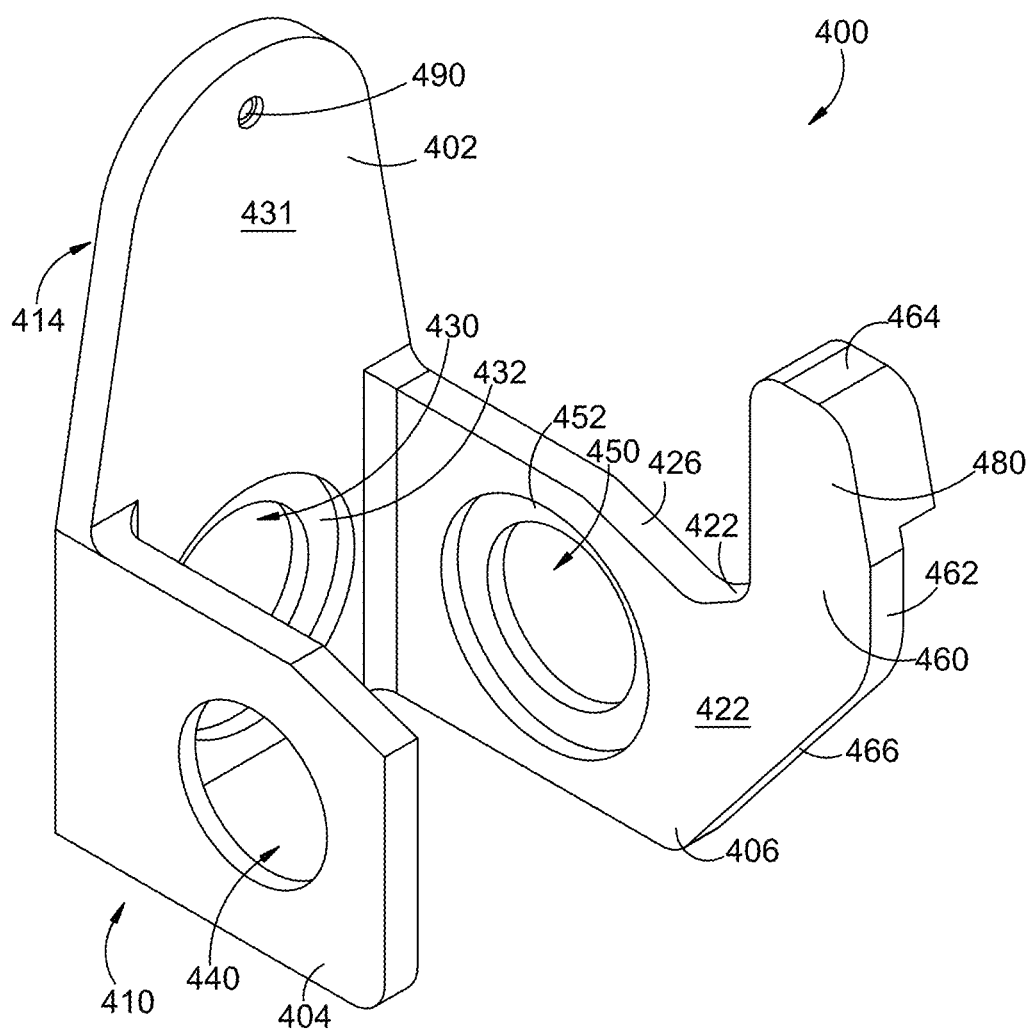
FIG. 20 is a top-front-left perspective view of the A-axis frame of FIG. 19.

As shown in FIG. 19, the right side plate 406 includes an extended portion 460 that extends forward to a front edge 462 for a distance of approximately 5.9 inches and extends upward to a top edge 464 for a distance of approximately 7.44 inches. A lower portion 466 of the extended portion tapers upward at an angle of approximately 38.4 degrees to the front edge. The top edge of the extended portion may be a distance of approximately 8 inches above the lower portion. The front edge may be spaced approximately 3.65 inches from a rear edge 470. The rear edge extends downward approximately 7.2 inches and intersects a curved upper side 472 of the lower portion, which extends from the rear edge to the forward upper portion 426 of the main rectangular body of the right side plate to provide additional clearance for components of the B-axis gimbal assembly 240.

A mounting protrusion 480 is formed on the upper 2.5 inches of the extended portion 460 of the right side plate 406. The mounting protrusion extends outward away from the extended portion in a direction away from the left side plate 404 for a distance of approximately 1.1 inch. A circular bore 482 is formed in the mounting protrusion. The circular bore has a diameter of approximately 0.5 inch. The circular bore is centered horizontally on the mounting protrusion, and the center of the circular bore is positioned approximately 1 inch from the top edge 464. The circular bore is threaded to receive a mating screw described below. The mounting protrusion is chamfered at an angle of approximately 12.42 degrees for a distance of approximately 4.936 inches from the top edge.

The B-axis positioning system 250 includes a B-axis motor 484 rotatably mounted to the mounting protrusion 480 of the A-axis frame 400. In an exemplary embodiment, a fastener (not shown) passes through a corresponding U-shaped bracket 352 and engages the circular bore 382 of the mounting protrusion 480 of the extended portion 460 of the right side plate 406 to rotatably connect the U-shaped bracket to the mounting protrusion. Preferably, bearings (not shown) are included to allow the U-shaped bracket to pivot freely with respect to the pivot mount. In an exemplary embodiment, the U-shaped bracket associated with the B-axis motor is common in size and shape to the U-shaped bracket associated with the A-axis motor 350. Preferably, bearings (not shown) are included to allow the U-shaped bracket to pivot freely with respect to the mounting protrusion.

Similar to the A-axis motor described above, the B-axis motor may be rigidly mounted to the bracket with any appropriate fasteners. A leadscrew 486 is coupled to the B-axis motor such that the motor may drive the leadscrew in a clockwise or counterclockwise rotation. The leadscrew lies in a second plane passing longitudinally through the leadscrew. The second plane orthogonal to the B-axis. An exemplary embodiment includes the A-axis motor and the B-axis motor being common to each other in size, shape, and model. As described above, a screw support bearing 356 is fixedly mounted to the U-shaped bracket to rotatably support the leadscrew.

A through bore 490 is formed in the upper portion 414 of the base plate 402 of the A-axis frame 400 approximately 1.43 inch from the top of the base plate. The through bore has a diameter of approximately 0.5 inch. A leadscrew receiver assembly 492 is rotatably mounted to the upper portion of the base plate of the A-axis frame with a fastener engaging the through bore. In an exemplary embodiment, the leadscrew receiver assembly includes an L-shaped bracket 494 rotatably mounted to the upper portion of the base plate. Preferably, bearings (not shown) are included to allow the L-shaped bracket to pivot freely with respect to the upper portion of the base plate of the A-axis frame.

A leadscrew nut 496 is fixedly mounted to the L-shaped bracket 494. The leadscrew nut receives the corresponding leadscrew 354 such that rotation of the leadscrew causes translation of the leadscrew nut. When the leadscrew nut is translated, the A-axis gimbal assembly 230 is rotated about the A-axis bearing support bolt 320A extending from the base platform 210. An exemplary embodiment may utilize leadscrew nuts such as the FSCDIN/FSIDIN series ballscrews manufactured by HIWIN Technologies Corp.

The B-axis gimbal assembly 240 comprises a B-axis frame 600 (shown in FIGS. 28-38) that includes a bottom plate 602, a left side plate 604, a right side plate 606, and a motor mount platform 608. The two side plates are perpendicular to both the bottom plate and the motor mount platform. The bottom plate is generally rectangular and includes a through bore 610 defined therein. The through bore is sized to receive the spindle 242 with an appropriate fit. The spindle may be permanently or semi-permanently secured to the bottom plate in any appropriate manner including, in non-limiting examples, press-fit or interference fit, gluing, welding, brazing, soldering, fastening with bolts, securing nuts, tightening sleeves, and the like. The spindle may be attached to the spindle drive shaft 266 such that the drive shaft may rotate within the spindle. The spindle may extend downward beyond the bottom plate of the B-axis frame. A conventional chuck 116 may be connected to the lower end of the spindle. The chuck may selectively receive a tool 118 as described above.

The left side plate 604 of the B-axis frame 600 includes a left side plate through bore 612. The through bore is positioned substantially in the center of the left side plate. The through bore is surrounded by an outer circular recess 614 on the left outer wall 616 and surrounded by an inner circular recess 618 on the left inner wall 620. The left side plate is connected to the bottom plate 602 at its lowermost end and to the motor mount platform 608 at its uppermost end. The left side plate also includes a recessed or chamfered portion 622 in at least one location to allow for more range of movement of the B-axis gimbal assembly 240.

The right side plate 606 of the B-axis frame 600 includes a right side plate through bore 630. The through bore is positioned such that it is aligned with the left side plate through bore 612 along a common axis. The through bore is surrounded by an outer circular recess 632 on the right outer wall 634 and surrounded by an inner circular recess 636 on the right inner wall 638.

Figure 32:
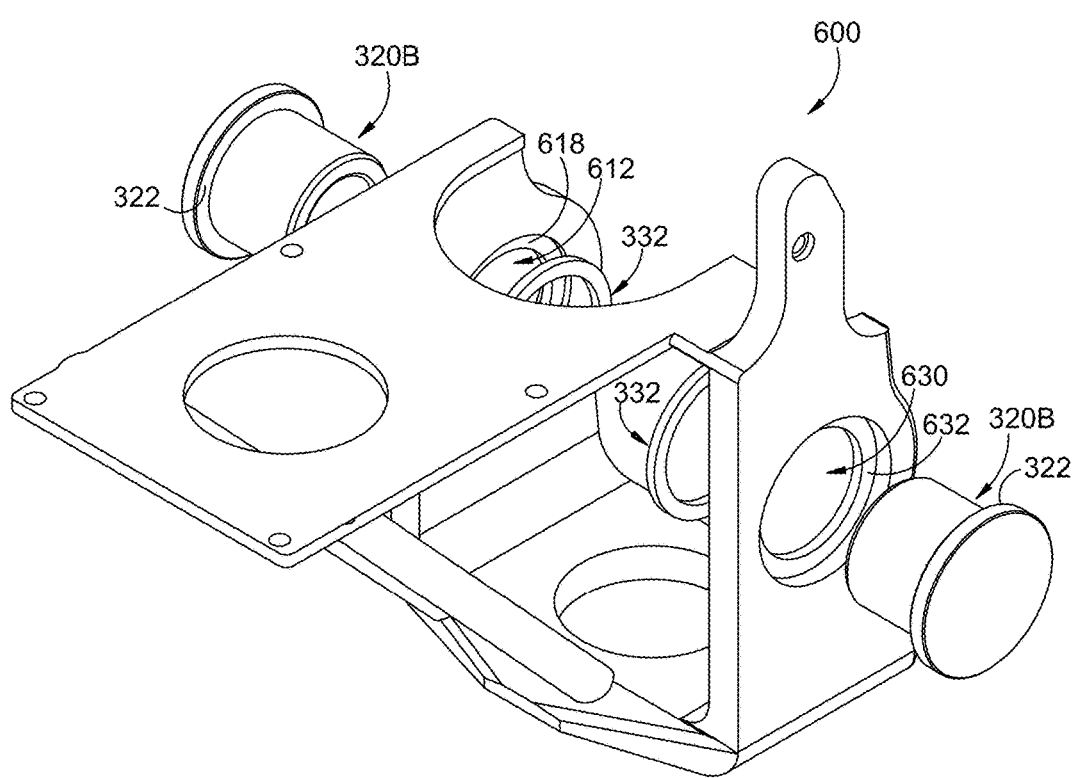
FIG. 32 is a top-front-right perspective view of the B-axis frame of FIG. 28 with two bearing support bolts and spacers exploded therefrom.
Figure 33:
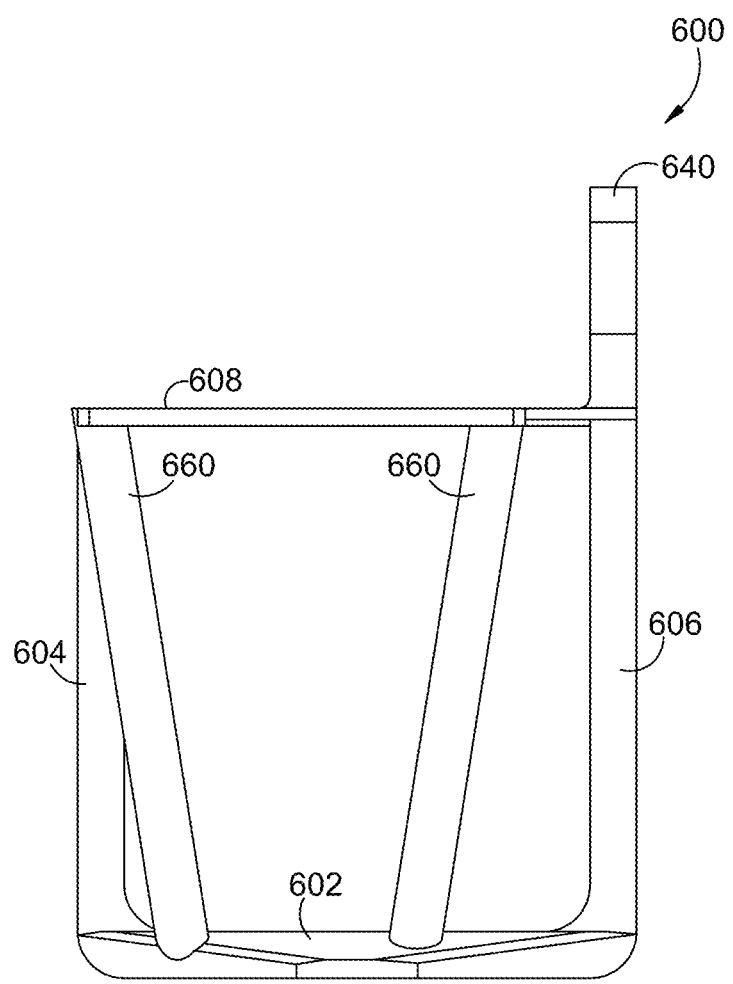
FIG. 33 is front elevation view of the B-axis frame of FIG. 28.
Figure 34:
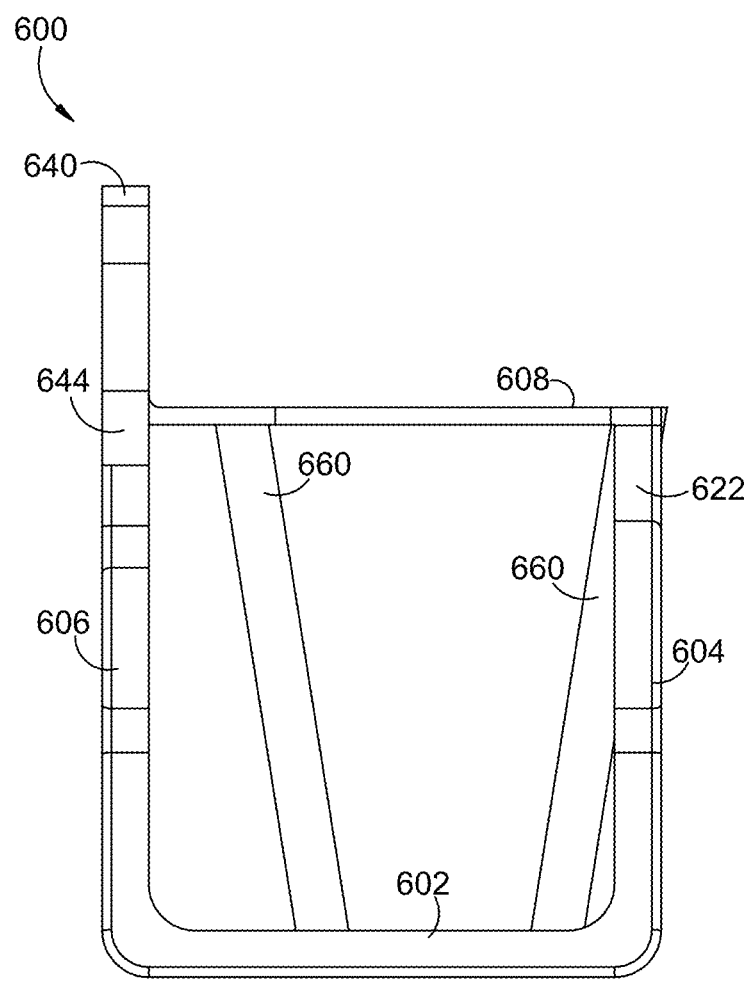
FIG. 34 is a rear elevation view of the B-axis frame of FIG. 28.
Figure 35:
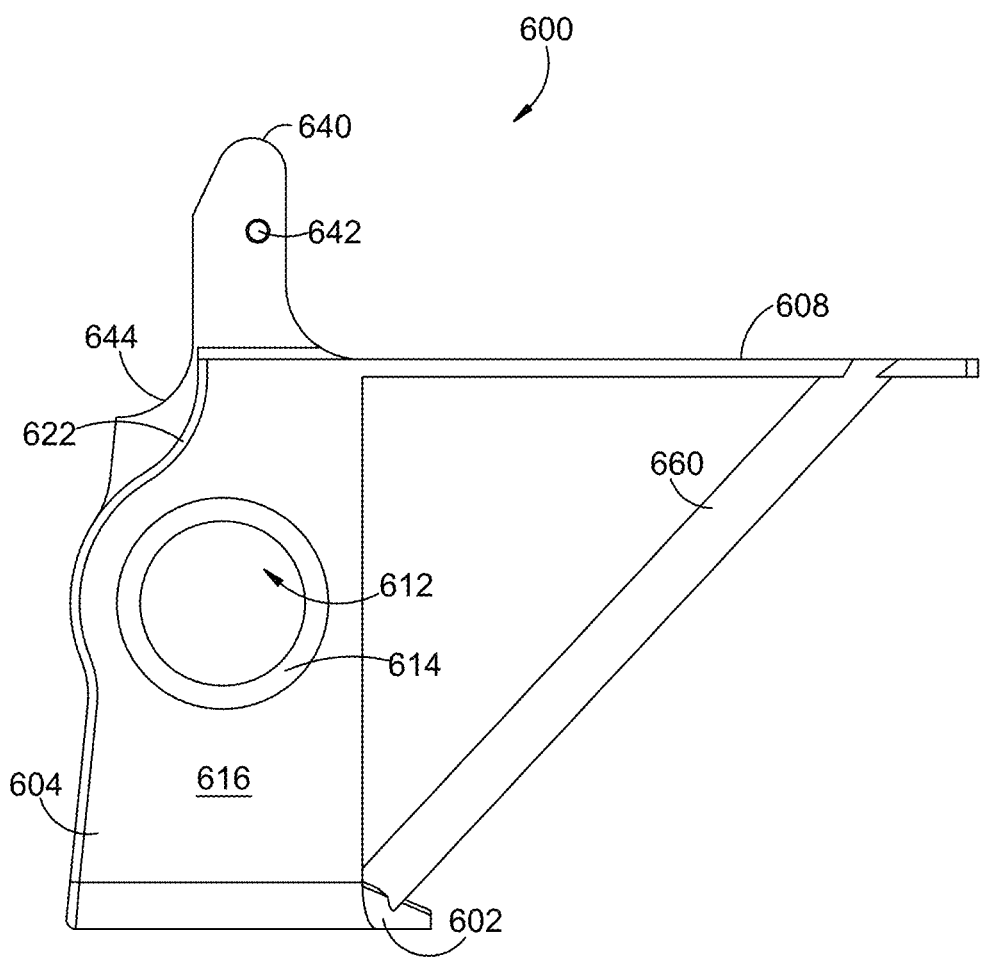
FIG. 35 is left side elevation view of the B-axis frame of FIG. 28.
Figure 36:
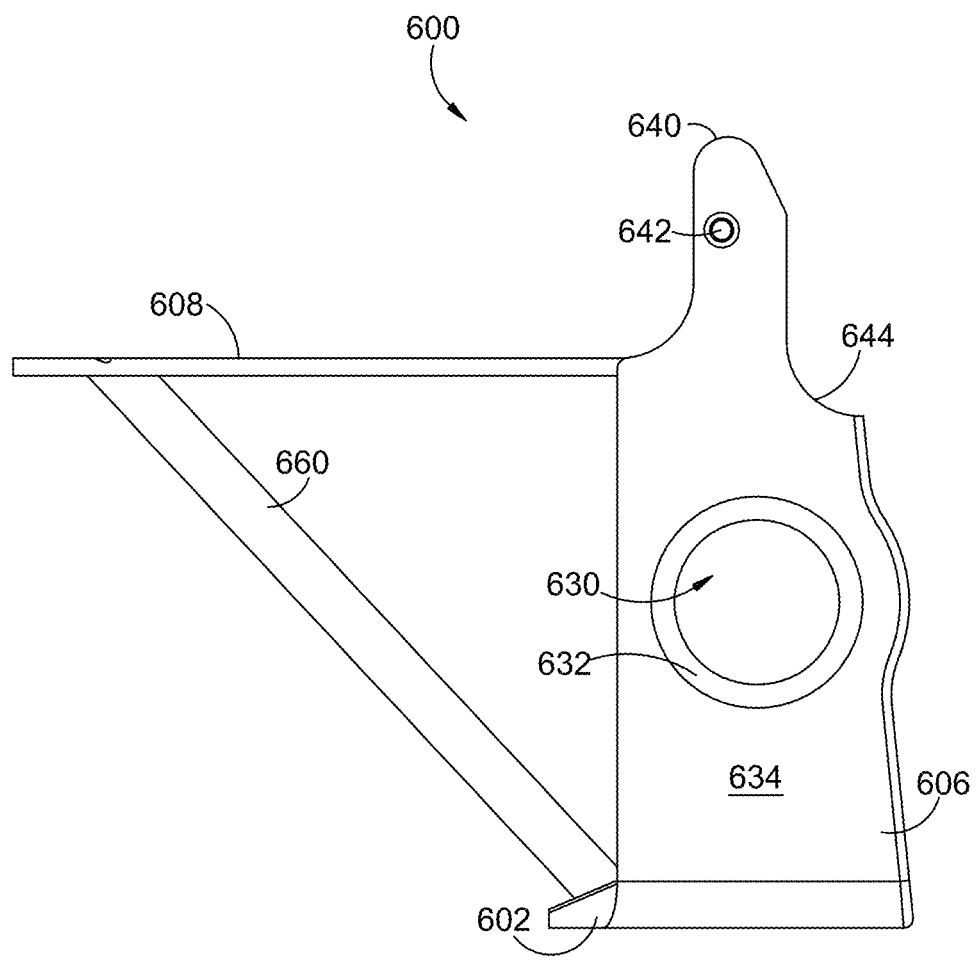
FIG. 36 is a right side elevation view of the B-axis frame of FIG. 28.
Figure 37:
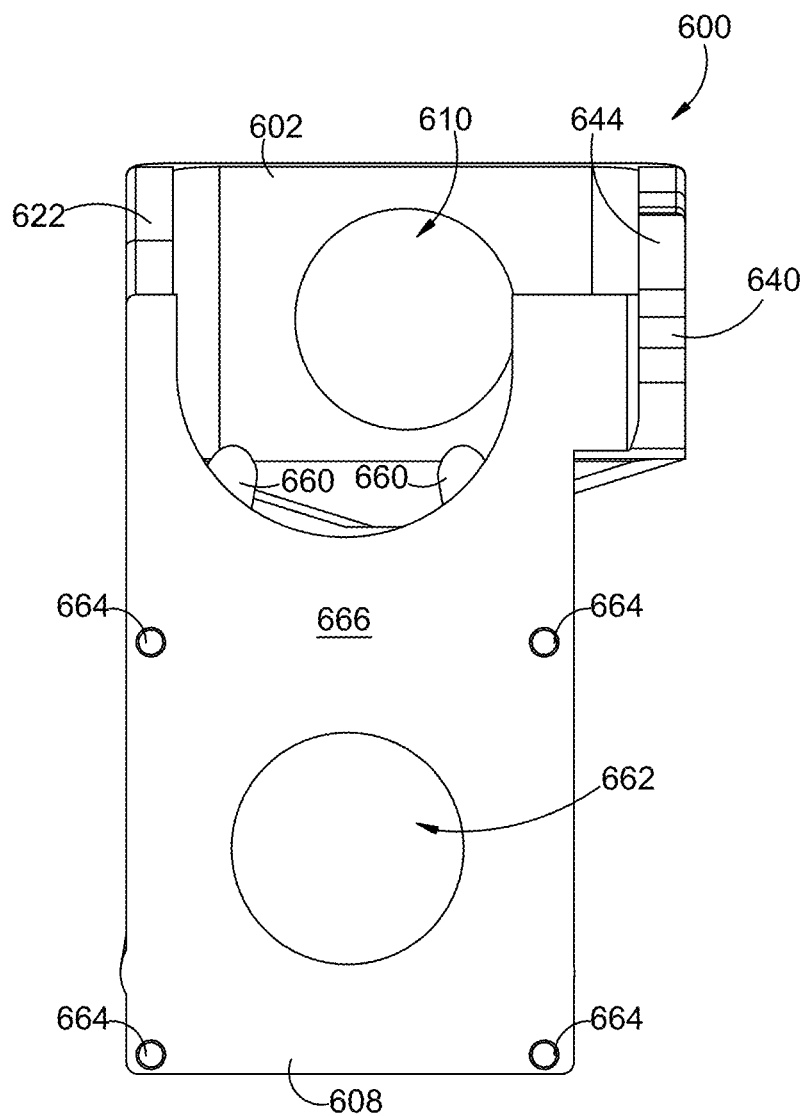
FIG. 37 is a top plan view of the B-axis frame of FIG. 28.
Figure 38:
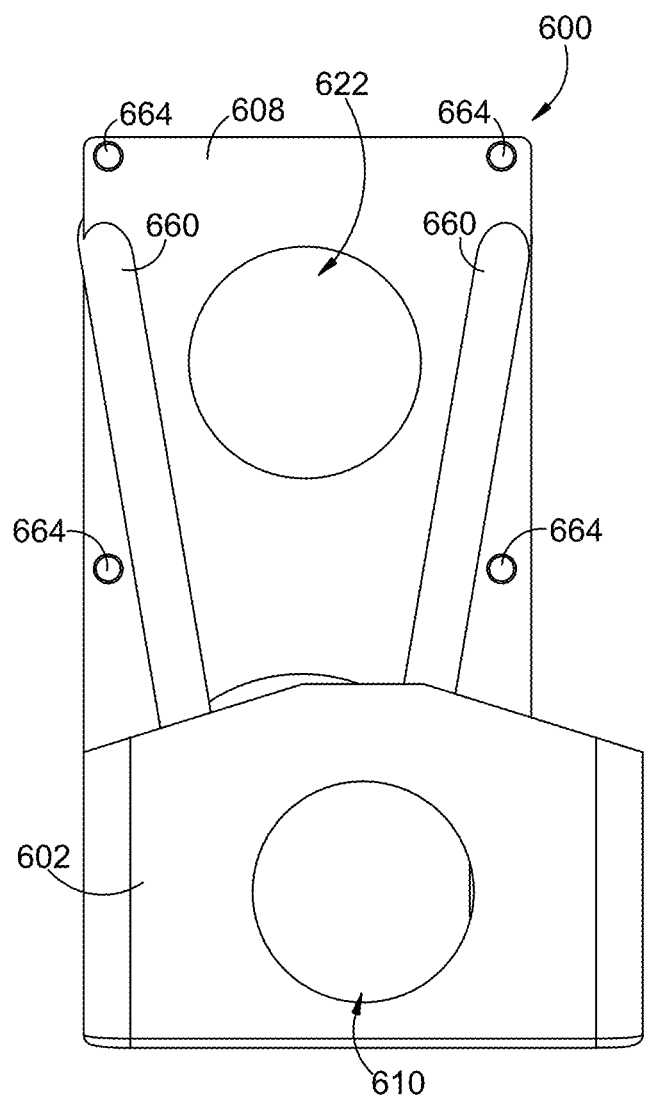
FIG. 38 is a bottom plan view of the B-axis frame of FIG. 28.

As shown in FIG. 32, each of the left side plate through bore 612 and the right side plate through bore 630 receives a corresponding B-axis bearing support bolt 320B. In an exemplary embodiment, the B-axis bearing support bolts corresponding to the through bores may be of the same construction as the A-axis bearing support bolt 320A received in the base platform 210. Alternatively, the B-axis bearing support bolts may be of varying sizes and shapes. Similar to the discussed features above, each B-axis bearing support bolt includes a flange 322. The flange of a first B-axis bearing support bolt is received in the outer circular recess 614 of the left side plate 604. The flange of a second B-axis bearing support bolt is received in the outer circular recess 632 of the right side plate 606. Circular spacers 332, similar to what has been discussed above, are received in the inner circular recesses. A first circular spacer is received in the inner circular recess 618 of the left side plate and may extend beyond the left inner wall 620 by a selected distance. A second circular spacer is received in the inner circular recess of the right side plate and may extend beyond the right inner wall 638 by a selected distance. This configuration prevents the inner walls of the B-axis frame 600 from engaging the left side plate 404 and right side plate 406 of the A-axis frame 400.

Similar to the configuration discussed above, each B-axis bearing support bolt 320B is received in a corresponding inner passage 440 of a respective bearing assembly 434. A retaining nut 442 (shown in FIG. 21) is secured to the threaded end 326 of each B-axis corresponding bearing support bolt such that the B-axis frame 600 and A-axis frame 400 are assembled together.

The right side plate 606 of the B-axis frame 600 also includes an extended portion 640 at its uppermost end. The extended portion extends above the level of the motor mount platform 608 and includes a circular bore 642 defined in the extended portion on the right outer wall 634. The circular bore may be a through bore, or it may extend only partly into the right side plate from the right outer wall. The circular bore may also be threaded to accept an appropriately threaded fastener.

Similar to the discussion above with regard to the through bore 490 in the base plate 402, a leadscrew receiver assembly 492 is rotatably mounted to the extended portion 640 of the right side plate 606 of the B-axis frame 600 with a fastener (not shown) passing through an L-shaped bracket 494 (similar to the A-axis L-shaped bracket) and engaging the circular bore 642 of the extended portion 414 of the A-axis frame 400. Preferably, bearings (not shown) are included to allow the L-shaped bracket to pivot freely with respect to the upper portion of the base plate of the A-axis frame. As discussed above, rotation of the leadscrew 486 causes translation of the corresponding leadscrew nut 496. When the leadscrew nut is translated, the B-axis gimbal assembly 240 is rotated about the coaxial B-axis bearing support bolts 320B extending through the through bores 612, 630 of the B-axis frame.

The right side plate 606 further includes a recessed or chamfered portion 644 that corresponds to the recessed or chamfered portion 622 of the left side plate 604. The right side plate is connected to the bottom plate 602 at its lowermost end and connected to the motor mount platform 608 at the base of the extended portion 640.

The motor mount platform 608 is mounted to one or more of the left side plate 604, the right side plate 606, and the bottom plate 602. In one embodiment, the motor mount platform is connected directly to the left side plate and right side plate. The motor mount platform is connected to the bottom plate by at least one support 660. The motor mount platform extends away from the bottom plate such that the spindle drive motor 244 is mounted to the motor mount platform sufficiently far away from the rest of the milling machine 100 during use. This configuration allows considerable maneuverability for the adapter 200 while preventing the spindle drive motor from coming into contact with the base platform 210 or another part of the milling machine. The motor mount platform furthers includes a shaft receiving through bore 662. The shaft receiving through bore may be sized and located such that a portion of the spindle drive motor (such as part of the motor housing itself, a drive shaft of the motor, or some coupling thereto) passes through the motor mount platform to interact with components disposed below the motor mount platform. The motor mount platform further includes at least one fastener bore 664. The fastener bores may be through bores or may only extend a portion of the way through the motor mount platform from a top surface 666 of the motor mount platform. The motor mount platform may be any appropriate shape to receive a corresponding motor and may include any number of fastener bores to adequately secure the motor to the motor mount platform. A platform recess 668 may be formed in the motor mount platform. The platform recess is arranged and shaped to provide access to the spindle drive system 260.

Figure 39:
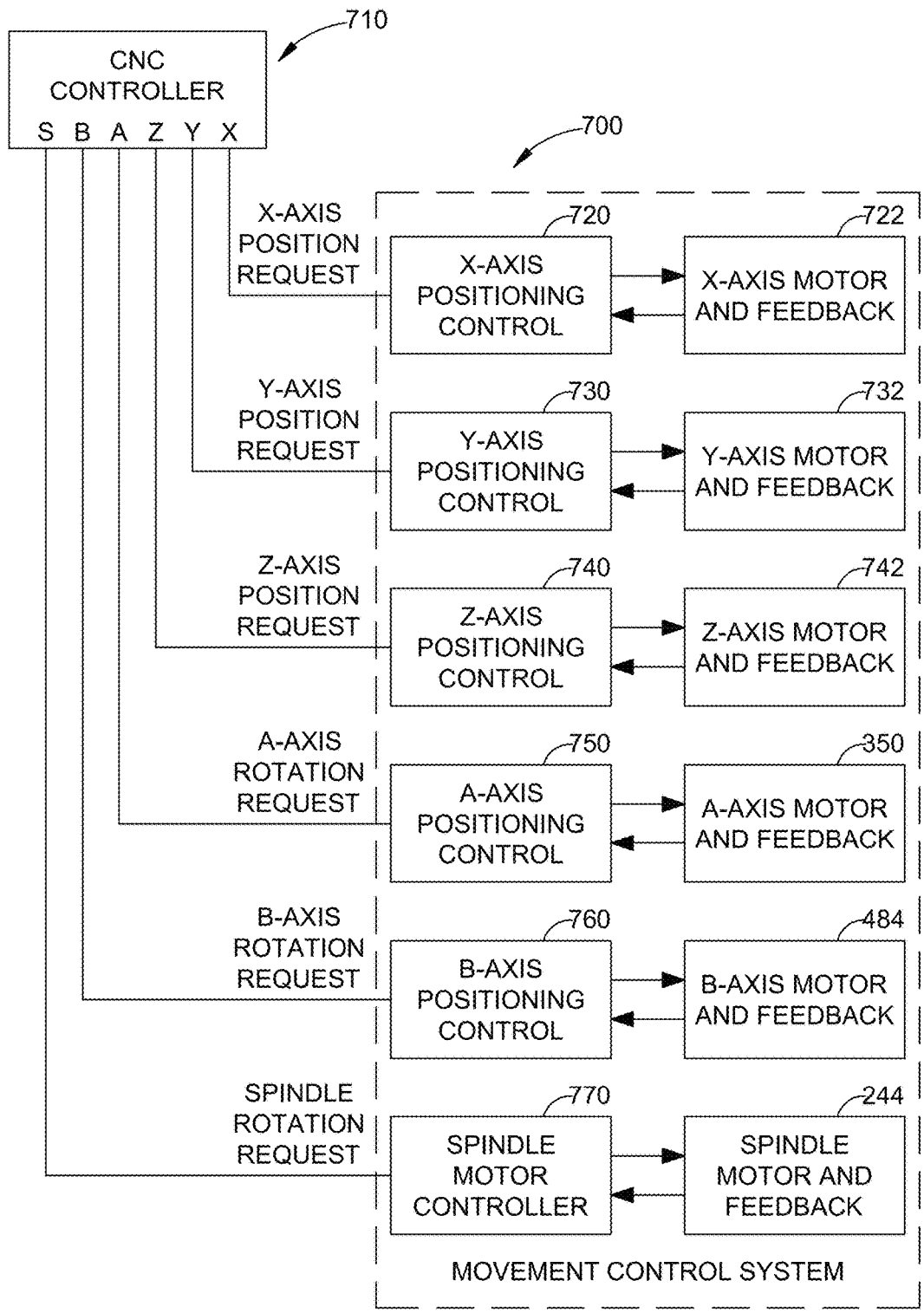
FIG. 39 illustrates a block diagram of the electronic components that drive the milling machine with the adapter installed to provide 5-axis operation.
Figure 40:
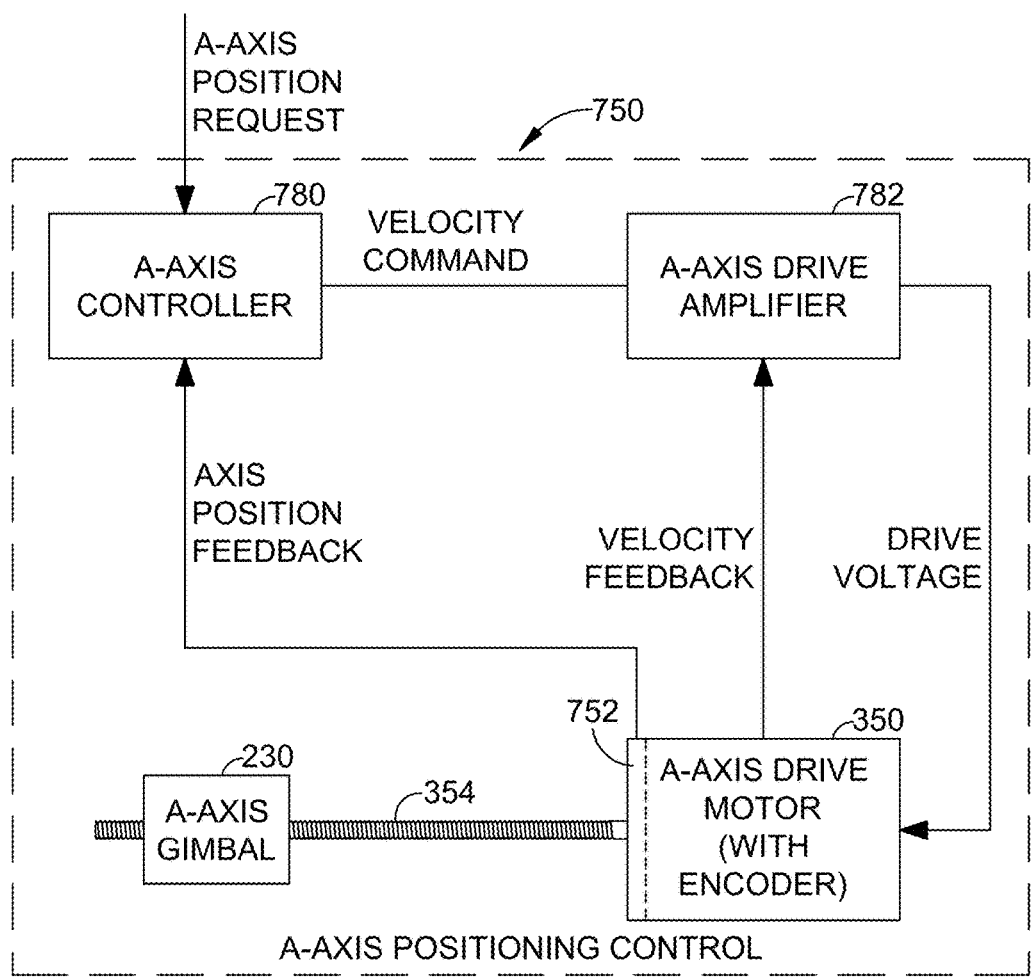
FIG. 40 illustrates a block diagram of the A-axis positioning control unit of FIG. 39.
Figure 41:
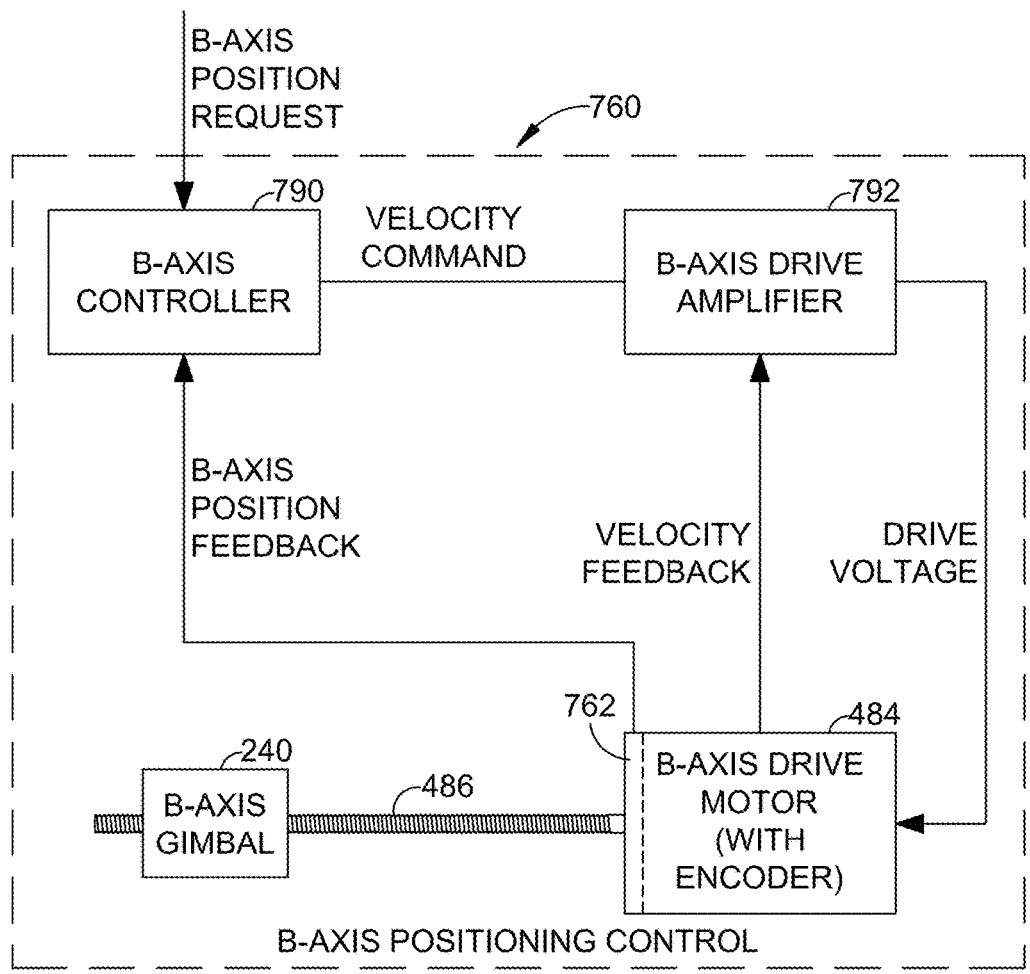
FIG. 41 illustrates a block diagram of the B-axis positioning control unit of FIG. 39.

In the illustrated embodiment, the adapter 200 is controlled by control system 700 illustrated in FIGS. 39, 40 and 41. As shown in FIG. 39, the control system is responsive to a computerized numerical control (CNC) system 710, which generates position requests to the control circuit to move the spindle 242 to a specified location as determined by an X-axis position request, a Y-axis position request, a Z-axis position request, an A-axis rotation request and a B-axis rotation request. The control system further controls the rotation of the spindle 242 (FIG. 2) via spindle rotation request signals sent to the control system.

The X-axis position request is communicated to an X-axis positioning control unit 720 with the control system 700. The X-axis positioning control unit sends voltage signals to an X-axis positioning motor 722, which moves the head support frame 106 (FIG. 2) along the X-axis of the gantry 104 (FIG. 2) and thus moves the adapter 200 to a selected position along the X-axis.

The Y-axis position request is communicated to a Y-axis positioning control unit 730 with the control system 700. The Y-axis positioning control unit sends voltage signals to a Y-axis positioning motor 732, which moves the gantry 104 (FIG. 2) along the Y-axis of the support platform 102 (FIG. 2) and thus moves the adapter 200 to a selected position along the Y-axis.

The Z-axis position request is communicated to a Z-axis positioning control unit 740 with the control system 700. The Z-axis positioning control unit sends voltage signals to a Z-axis positioning motor 742, which moves the vertically moveable head support 110 (FIG. 2) vertically with respect to the Z-axis of the support platform 102 (FIG. 2) and thus moves the adapter 200 to a selected position along the Z-axis.

Although illustrated as part of the control system 700, the X-axis positioning control unit 720, the Y-axis positioning control unit 730 and the Z-axis positioning control unit 740 may be part of the milling machine 100 (FIG. 2); and the X-axis, Y-axis and Z-axis position request signals may be sent directly to the respective control units within the milling machine. The milling machine is advantageously a conventional milling machine, which is represented schematically in FIGS. 1 and 2. The movements of the adapter 200 in the X-axis, the Y-axis and the Z-axis are provided by motors and other components within the milling machine.

The control system 700 controls the angular position of the spindle 242 with respect to the Z-axis of adapter 200. The control system includes an A-axis positioning control unit 750 that controls the angular position of the A-axis gimbal assembly 230. The control system also includes a B-axis positioning control unit 760 that controls the angular position of the B-axis gimbal assembly 240. The control system further includes a spindle motor control unit 770 that controls the spindle drive motor 244, thereby controlling the speed, direction, and duration of rotation of a tool 118 received in a chuck 116 connected to the spindle 242. In some embodiments, the spindle motor control unit may function in a manner similar to that described below in conjunction with the A-axis positioning control unit and B-axis positioning control unit. The spindle motor control unit may also function in any other conventional or known manner with regard to rotating tool control in milling machines.

As shown in FIGS. 15D, 15E and 15F, the A-axis gimbal assembly 230 enables the adapter to rotate the spindle 242 about the Y-axis to an angular position from approximately −25 degrees from vertical (FIG. 15D) to approximately +25 degrees from vertical (FIG. 15F). An A-axis positioning request is communicated from the CNC controller 710 to the A-axis positioning control unit 750. The A-axis positioning control unit sends voltage signals to the A-axis positioning motor 350 (described above), which rotates the A-axis leadscrew 354 to cause the A-axis gimbal assembly to rotate about the A-axis bearing support bolt 320A attaching the A-axis gimbal assembly to the base plate 210, thus rotating the spindle about the A-axis. In the illustrated embodiment, the A-axis positioning motor includes a resolver or encoder 752 that provides feedback to the A-axis positioning control unit to confirm that the A-axis positioning motor has turned the A-axis leadscrew the correct number of turns to rotate the A-axis gimbal to the requested angular position.

As shown in FIGS. 15B, 15E and 15H, the B-axis gimbal assembly 240 enables the adapter to rotate the spindle 242 about the X-axis to an angular position from approximately −25 degrees from vertical (FIG. 15B) to approximately +25 degrees from vertical (FIG. 15H). A B-axis positioning request is communicated from the CNC controller 710 to the B-axis positioning control unit 760. The B-axis positioning control unit sends voltage signals to the B-axis positioning motor 484 (described above), which rotates the B-axis leadscrew 486 to cause the B-axis gimbal 240 to rotate about the B-axis bearing support bolts 320B attaching the B-axis gimbal assembly to the A-axis gimbal 230. In the illustrated embodiment, the B-axis positioning motor includes a resolver or encoder 762 that provides feedback to the B-axis positioning control unit to confirm that the B-axis positioning motor has turned the B-axis screw the correct number of turns to rotate the B-axis gimbal to the requested angular position.

As further shown in FIGS. 15A, 15C, 15G and 15H, the A-axis gimbal 230 and the B-axis gimbal 240 are operable together to move the spindle 242 to positions caused by the combined rotations around the two axes.

FIG. 40 illustrates the A-axis positioning control unit 750 in more detail. The positioning control unit includes an A-axis controller 780, which receives the A-axis position request signal from the CNC controller (FIG. 39). The A-axis controller also receives an A-axis position feedback signal from the position encoder 752 associated with the A-axis drive motor 350. The position encoder may be incorporated into the A-axis drive motor as illustrated in FIG. 40. In other embodiments, the position encoder may be a separate element coupled to sense the rotation of the A-axis positioning leadscrew 354. In still other embodiments, the position encoder may be a linear encoder that senses the position of the A-axis gimbal along the positioning leadscrew. In still other embodiments, the position encoder may directly sense the angular position of the A-axis gimbal.

The A-axis controller 780 is responsive to a difference between the requested A-axis position provided by the CNC controller 710 and the current A-axis position provided by the A-axis position feedback signal to generate an A-axis velocity command that provides directional and angular velocity information to an A-axis drive amplifier 782. The A-axis drive amplifier generates an A-axis drive voltage that is provided as an input to the A-axis drive motor 350 to cause the A-axis drive motor to rotate and turn the A-axis drive screw in the correct angular direction to rotate the A-axis gimbal 230 towards the correct angular position. The A-axis drive amplifier receives an A-axis velocity feedback signal from the A-axis drive motor and is responsive to the feedback signal to adjust the A-axis drive voltage as needed to maintain the desired rotational velocity. As the actual A-axis position approaches the requested A-axis position, the A-axis controller is responsive to decreasing difference between the actual position and the requested position to reduce and eventually cease the velocity command to the A-axis amplifier so that the A-axis drive motor is stopped with the A-axis gimbal in the requested position.

FIG. 41 illustrates the B-axis positioning control unit 760 in more detail. The positioning control unit includes a B-axis controller 790, which receives the B-axis position request signal from the CNC controller (FIG. 39). The B-axis controller also receives a B-axis position feedback signal from a position encoder 762 associated with the B-axis drive motor 484. The position encoder may be incorporated into the B-axis drive motor as illustrated in FIG. 41. In other embodiments, the position encoder may be a separate element coupled to sense the rotation of the B-axis positioning leadscrew 486. In still other embodiments, the position encoder may be a linear encoder that senses the position of the B-axis gimbal along the positioning leadscrew. In still other embodiments, the position encoder may directly sense the angular position of the B-axis gimbal.

The B-axis controller 790 is responsive to a difference between the requested B-axis position provided by the CNC controller 710 and the current B-axis position provided by the B-axis position feedback signal to generate a B-axis velocity command that provides directional and angular velocity information to a B-axis drive amplifier 792. The B-axis drive amplifier generates a B-axis drive voltage that is provided as an input to the B-axis drive motor 484 to cause the B-axis drive motor to rotate and turn the B-axis leadscrew 486 in the correct angular direction to rotate the B-axis gimbal 240 towards the correct angular position. The B-axis drive amplifier receives a B-axis velocity feedback signal from the B-axis drive motor and is responsive to the feedback signal to adjust the B-axis drive voltage as needed to maintain the desired rotational velocity. As the actual B-axis position approaches the requested B-axis position, the B-axis controller is responsive to decreasing difference between the actual position and the requested position to reduce and eventually cease the velocity command to the B-axis amplifier so that the B-axis drive motor is stopped with the B-axis gimbal in the requested position.

The commands for controlling the rotations of the A-axis gimbal 230 and the B-axis gimbal 240 are easily added to the conventional CNC code for the milling machine 100. For example, the following conventional CNC code moves the tool 118 (FIG. 2) to an X-position of 10 units, a Y-position of 6 units and a Z-position of −1 unit:

N1 X10.000 Y6.000 Z−1.000

The foregoing command is readily modified to rotate the A-axis gimbal 230 by 11.222 degrees (CW) and to rotate the B-axis gimbal 240 by −12.211 degrees (CCW):

N1 X10.000 Y6.000 Z−1.000 A11.222 B−12.211

The movements along the three linear axes (X, Y and Z) and about the two angular axes (A and B) can occur concurrently along with the precise control of the spindle motor 244. For example, the concurrent control of the 5-axes of movement and the rotation of the spindle motor can be used to move and rotate a tapping tool to generate threaded bores at an angle in a workpiece.

As illustrated herein, the A-axis drive motor 350 and the B-axis drive motor 484 operate with the respective leadscrews 354, 486 to produce linear movement of the respective screw mounts (L-shaped brackets) 494 along the lengths of the leadscrews. Although each rotation of the respective drive motor produces a corresponding incremental linear movement of the screw mount along the length of the respective leadscrew, the linear movement of the screw mount produces a nonlinear angular rotation of the respective gimbal. The relationship between the incremental linear movement along the leadscrew and the resulting incremental angular rotation of the gimbal depends on the current angular position of the gimbal when the incremental linear movement occurs. The relationships between the linear movements and the angular rotations at each angular position (or at each linear position) are readily determined in a calibration process. The relationships are mapped in a translation table, for example. In the illustrated embodiment, the translation table for the A-axis movement is included within the A-axis controller 780. The A-axis controller receives the A-axis position request in degrees and determines the movement of the A-axis screw mount required to rotate the A-axis gimbal 230 from the current position to the requested position. Similarly, the translation table for the B-axis movement is included within the B-axis controller 790. The B-axis controller receives the B-axis position request in degrees and determines the movement of the B-axis screw mount required to rotate the B-axis gimbal 240 from the current position to the requested position.

As described herein, the adapter 200 allows a conventional 3-axis milling machine to be converted to a 5-axis milling machine using a mechanically simple structure that is implemented with readily available motors and leadscrews.

As various changes could be made in the above constructions without departing from the scope of the invention, it is intended that all the matter contained in the above description or shown in the accompanying drawings shall be interpreted as illustrative and not in a limiting sense.

What is claimed is:

1. An adapter to convert a three-axis milling machine to a five-axis milling machine, wherein the milling machine includes a head support, the milling machine operable to move the head support in three orthogonal axes, the adapter comprising:
   a base platform configured to attach to the head support of the milling machine;
   a first gimbal assembly rotatably connected to the base platform to rotate about a first rotation axis;
   a second gimbal assembly rotatably connected to the first gimbal assembly to rotate about a second rotation axis orthogonal to the first rotation axis, the second gimbal assembly including a spindle and a motor coupled to the spindle to selectively rotate the spindle;
   a first gimbal positioning system operable to rotate the first gimbal assembly about the first rotation axis, the first gimbal positioning system including:
      a first motor rotatably connected to the base platform;
      a first leadscrew driven by the first motor; and
      a first leadscrew nut rotatably coupled to the first gimbal assembly, the first leadscrew nut configured to receive the first leadscrew;
   and
   a second gimbal positioning system operable to rotate the second gimbal assembly about the second rotation axis, the second gimbal positioning system including:
      a second motor rotatably connected to the first gimbal assembly;
      a second leadscrew driven by the second motor; and
      a second leadscrew nut rotatably coupled to the second gimbal assembly, the second leadscrew nut configured to receive the second leadscrew.

2. An adapter to convert a three-axis milling machine to a five-axis milling machine, the adapter comprising:
   a base platform configured to be attached to a head support of a three-axis milling machine, the base platform having a first planar surface;
   a first gimbal assembly configured to rotate about a first rotation axis, the first rotation axis perpendicular to and fixed with respect to the first planar surface of the base platform;
   a second gimbal assembly rotatably connected to the first gimbal assembly to rotate about a second rotation axis, the second rotation axis fixed with respect to the first rotation axis and orthogonal to the first rotation axis;
   a first leadscrew having a first leadscrew longitudinal axis, the first leadscrew positioned with the first leadscrew longitudinal axis in a first leadscrew plane, the first leadscrew plane orthogonal to the first rotation axis, the first leadscrew plane fixed and parallel to the first planar surface;
   a first gimbal positioning system coupled to the first gimbal assembly and configured to rotate the first gimbal assembly about the first rotation axis in response to rotation of the first leadscrew about the first leadscrew longitudinal axis;
   a second leadscrew having a second leadscrew longitudinal axis, the second leadscrew positioned with the second leadscrew longitudinal axis in a second leadscrew plane orthogonal to the second rotation axis;
   a second gimbal positioning system coupled to the second gimbal assembly and configured to rotate the second gimbal assembly about the second rotation axis in response to rotation of the second leadscrew about the second leadscrew longitudinal axis; and
   a spindle motor fixedly secured to the second gimbal assembly to move with the second gimbal assembly, the spindle motor configured to engage and selectively rotate a spindle.

3. A method of operating an adapter for converting a three-axis milling machine to a five-axis milling machine, the method comprising:
   attaching a base platform of the adapter to a head support of a three-axis milling machine, the base platform having a planar surface;
   rotating a first leadscrew of a first gimbal positioning system about a first leadscrew longitudinal axis, the first leadscrew longitudinal axis constrained to a first leadscrew plane parallel to the planar surface of the base platform;
   translating a first leadscrew nut coupled to the first leadscrew, the first leadscrew nut translating along the first leadscrew longitudinal axis in response to the first leadscrew rotating about the first leadscrew longitudinal axis;
   rotating a first gimbal assembly coupled to the first leadscrew nut, the rotation of the first gimbal assembly responsive to translation of the first leadscrew nut, the first gimbal assembly rotating about a first gimbal rotation axis perpendicular to the first leadscrew plane;
   rotating a second leadscrew of a second gimbal positioning system about a second leadscrew longitudinal axis, the second leadscrew longitudinal axis constrained to a second leadscrew plane, the second leadscrew plane perpendicular to the first leadscrew plane;
   translating a second leadscrew nut coupled to the second leadscrew, the second leadscrew nut translating along the second leadscrew longitudinal axis in response to the second leadscrew rotating about the second leadscrew longitudinal axis; and
   rotating a second gimbal assembly in response to translation of the second leadscrew nut, the second gimbal assembly rotating about a second gimbal rotation axis perpendicular to the second leadscrew plane, the second gimbal assembly supporting a spindle and a motor coupled thereto.

4. A method of operating an adapter for converting a three-axis milling machine to a five-axis milling machine, the method comprising:
  activating a first motor;
  rotating a first leadscrew with the first motor;
  translating a first leadscrew nut with rotational movement of the first leadscrew;
  rotating a first gimbal assembly about a first axis with translational movement of the first leadscrew nut;
  rotating a second gimbal assembly about the first axis with rotational movement of the first gimbal assembly, the second gimbal assembly supporting a spindle and a motor coupled thereto;
  activating a second motor;
  rotating a second leadscrew with the second motor;
  translating a second leadscrew nut with rotational movement of the second leadscrew; and
  rotating the second gimbal assembly about a second axis with translational movement of the second leadscrew nut.

5. The adapter to convert a three-axis milling machine to a five-axis milling machine as defined in claim 2, wherein:

the first gimbal positioning system includes:
  a first motor rotatably connected to the base platform, the first motor configured to rotate the first leadscrew about the first leadscrew longitudinal axis; and
  a first leadscrew nut coupled to the first gimbal assembly, the first leadscrew nut configured to receive the first leadscrew and to translate along the first leadscrew longitudinal axis in response to rotation of the first leadscrew;
  and
the second gimbal positioning system includes:
  a second motor rotatably connected to one of the first gimbal assembly and the second gimbal assembly, the second motor configured to rotate the second leadscrew about the second leadscrew longitudinal axis; and
  a second leadscrew nut coupled to the other of the first gimbal assembly and the second gimbal assembly, the second leadscrew nut configured to receive the second leadscrew and to translate along the second leadscrew longitudinal axis in response to rotation of the second leadscrew, the second gimbal assembly rotating in response to the translation of the second leadscrew nut.

\* \* \* \* \*